United States Patent
Hinson et al.

(10) Patent No.: US 7,237,245 B2
(45) Date of Patent: *Jun. 26, 2007

(54) OBJECT CONNECTIVITY THROUGH LOOSELY COUPLED PUBLISH AND SUBSCRIBE EVENTS

(75) Inventors: Gerald L. Hinson, Snohomish, WA (US); Mohsen M. Al-Ghosein, Redmond, WA (US); Donald W. Dumitru, Bellevue, WA (US); Donald J. McCrady, Redmond, WA (US); Seth B. Pollack, Seattle, WA (US); Stephen T. Swartz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 275 days.

This patent is subject to a terminal disclaimer.

(21) Appl. No.: 10/993,070

(22) Filed: Nov. 18, 2004

(65) Prior Publication Data

US 2005/0071849 A1    Mar. 31, 2005

Related U.S. Application Data

(63) Continuation of application No. 10/955,975, filed on Sep. 29, 2004, which is a continuation of application No. 09/257,363, filed on Feb. 23, 1999, now Pat. No. 6,829,770.

(51) Int. Cl.
*G06F 9/46* (2006.01)
(52) U.S. Cl. ...................... 719/318; 719/328
(58) Field of Classification Search ................ 719/318, 719/328; 709/201, 223, 224; 718/100
See application file for complete search history.

(56) References Cited

U.S. PATENT DOCUMENTS

| | | | |
|---|---|---|---|
| 4,635,208 A | 1/1987 | Coleby et al. |
| 4,677,576 A | 6/1987 | Berlin, Jr. et al. |
| 4,800,488 A | 1/1989 | Agrawal et al. |
| 4,821,220 A | 4/1989 | Duisberg |
| 4,953,080 A | 8/1990 | Dysart et al. |
| 4,972,437 A | 11/1990 | Citron et al. |
| 5,075,848 A | 12/1991 | Lai et al. |
| 5,093,914 A | 3/1992 | Coplien et al. |

(Continued)

FOREIGN PATENT DOCUMENTS

EP         0 414 624 A      2/1991

(Continued)

OTHER PUBLICATIONS

U.S. Appl. No. 08/959,139, filed Oct. 28, 1997, Helland et al.

(Continued)

*Primary Examiner*—William Thomson
*Assistant Examiner*—Van H. Nguyen
(74) *Attorney, Agent, or Firm*—Klarquist Sparkman, LLP

(57) ABSTRACT

An object-based event communications system supplies an event distribution object having an outgoing-from-publisher event interface and associated with unique identifiers defined for a publisher that is programmed to fire events by calling a method on the event distribution object's outgoing-from-publisher event interface. The event communications system stores subscriptions of subscriber objects to methods of the outgoing-from-publisher event interface. On receiving a call from a publisher to its outgoing-from-publisher interface methods, the event distribution object multi-casts calls to counterpart methods of subscriber objects that have stored subscriptions to the respective outgoing-from-publisher interface methods.

17 Claims, 29 Drawing Sheets

U.S. PATENT DOCUMENTS

| | | |
|---|---|---|
| 5,119,475 A | 6/1992 | Smith et al. |
| 5,125,091 A | 6/1992 | Staas, Jr. et al. |
| 5,133,075 A | 7/1992 | Risch |
| 5,151,987 A | 9/1992 | Abraham et al. |
| 5,168,441 A | 12/1992 | Onarheim et al. |
| 5,181,162 A | 1/1993 | Smith et al. |
| 5,210,874 A | 5/1993 | Karger |
| 5,212,793 A | 5/1993 | Donica et al. |
| 5,301,280 A | 4/1994 | Schwartz et al. |
| 5,307,490 A | 4/1994 | Davidson et al. |
| 5,315,703 A | 5/1994 | Matheny et al. |
| 5,404,523 A | 4/1995 | DellaFera et al. |
| 5,442,791 A | 8/1995 | Wrabetz et al. |
| 5,455,953 A | 10/1995 | Russell |
| 5,463,625 A | 10/1995 | Yasrebi |
| 5,481,715 A | 1/1996 | Hamilton et al. |
| 5,485,617 A | 1/1996 | Stutz et al. |
| 5,504,898 A | 4/1996 | Klein |
| 5,511,197 A | 4/1996 | Hill et al. |
| 5,517,645 A | 5/1996 | Stutz et al. |
| 5,519,863 A | 5/1996 | Allen et al. |
| 5,519,867 A | 5/1996 | Moeller et al. |
| 5,560,029 A | 9/1996 | Papadopoulos et al. |
| 5,574,862 A | 11/1996 | Marianetti, II |
| 5,574,918 A | 11/1996 | Hurley et al. |
| 5,577,251 A | 11/1996 | Hamilton et al. |
| 5,577,252 A | 11/1996 | Nelson et al. |
| 5,581,686 A | 12/1996 | Koppolu et al. |
| 5,581,760 A | 12/1996 | Atkinson et al. |
| 5,598,562 A | 1/1997 | Cutler et al. |
| 5,606,719 A | 2/1997 | Nichols et al. |
| 5,619,710 A | 4/1997 | Travis, Jr. et al. |
| 5,625,775 A | 4/1997 | Davis et al. |
| 5,652,888 A | 7/1997 | Burgess |
| 5,675,796 A | 10/1997 | Hodges et al. |
| 5,687,370 A | 11/1997 | Garst et al. |
| 5,689,708 A | 11/1997 | Regnier et al. |
| 5,764,897 A | 6/1998 | Khalidi |
| 5,787,251 A | 7/1998 | Hamilton et al. |
| 5,787,281 A | 7/1998 | Schreiber et al. |
| 5,790,789 A | 8/1998 | Suarez |
| 5,794,038 A | 8/1998 | Stutz et al. |
| 5,802,291 A | 9/1998 | Balick et al. |
| 5,822,585 A | 10/1998 | Noble et al. |
| 5,826,270 A | 10/1998 | Rutkowski et al. |
| 5,838,916 A | 11/1998 | Domenikos et al. |
| 5,848,234 A | 12/1998 | Chernick et al. |
| 5,857,197 A | 1/1999 | Mullins |
| 5,857,201 A | 1/1999 | Wright, Jr. et al. |
| 5,864,669 A | 1/1999 | Osterman et al. |
| 5,870,605 A | 2/1999 | Bracho et al. |
| 5,872,976 A | 2/1999 | Yee et al. |
| 5,884,316 A | 3/1999 | Bernstein et al. |
| 5,887,171 A | 3/1999 | Tada et al. |
| 5,889,942 A | 3/1999 | Orenshteyn |
| 5,889,957 A | 3/1999 | Ratner et al. |
| 5,907,675 A | 5/1999 | Aahlad |
| 5,913,061 A | 6/1999 | Gupta |
| 5,933,593 A | 8/1999 | Arun et al. |
| 5,958,004 A | 9/1999 | Helland et al. |
| 5,958,010 A | 9/1999 | Agarwal et al. |
| 5,991,536 A | 11/1999 | Brodsky et al. |
| 6,021,443 A | 2/2000 | Bracho et al. |
| 6,026,428 A | 2/2000 | Hutchison et al. |
| 6,061,723 A * | 5/2000 | Walker et al. ............... 709/224 |
| 6,061,796 A | 5/2000 | Chen et al. |
| 6,094,688 A | 7/2000 | Mellen-Garnett et al. |
| 6,105,147 A | 8/2000 | Molloy |
| 6,125,400 A | 9/2000 | Cohen et al. |
| 6,131,118 A * | 10/2000 | Stupek, Jr. et al. ......... 709/223 |
| 6,134,594 A | 10/2000 | Helland et al. |
| 6,173,327 B1 | 1/2001 | De Borst et al. |
| 6,182,119 B1 | 1/2001 | Chu |
| 6,182,158 B1 | 1/2001 | Kougiouris et al. |
| 6,185,590 B1 | 2/2001 | Klein |
| 6,253,252 B1 | 6/2001 | Schofield |
| 6,253,256 B1 | 6/2001 | Wollrath et al. |
| 6,298,378 B1 * | 10/2001 | Angal et al. ................. 709/223 |
| 6,324,589 B1 | 11/2001 | Chessell |
| 6,393,458 B1 | 5/2002 | Gigliotti et al. |
| 6,425,017 B1 | 7/2002 | Dievendorff et al. |
| 6,442,620 B1 | 8/2002 | Thatte et al. |
| 6,457,065 B1 | 9/2002 | Rich et al. |
| 6,477,585 B1 | 11/2002 | Cohen |
| 6,567,861 B1 | 5/2003 | Kasichainula et al. |
| 6,631,425 B1 | 10/2003 | Helland et al. |
| 6,651,109 B1 | 11/2003 | Beck et al. |
| 6,684,246 B1 | 1/2004 | Hasha |
| 6,748,455 B1 * | 6/2004 | Hinson et al. ............... 719/318 |
| 6,813,769 B1 | 11/2004 | Limprecht et al. |
| 6,832,380 B1 | 12/2004 | Lau et al. |
| 6,859,829 B1 * | 2/2005 | Parupudi et al. ............ 709/224 |
| 7,039,919 B1 | 5/2006 | Hunt |

FOREIGN PATENT DOCUMENTS

| | | |
|---|---|---|
| EP | 0 623 876 A2 | 9/1994 |
| EP | 0 674 260 A | 9/1995 |
| EP | 0 738 966 A | 10/1996 |
| EP | 0 777 178 A | 6/1997 |
| WO | WO 98 02809 A | 1/1998 |

OTHER PUBLICATIONS

Skeen, "Enabling the Real-Time Enterprise," BYTE Magazine, Core Technologies, pp. 1-5 and illustrations "Reliable Multicast Protocol in Action" and "Multilevel Caching Over a WAN" (Jan. 1998).

Montgomery, "Distributing Components: For CORBA and DCOM it's time to get practical," BYTE Magazine, Special Report, pp. 1-10 and illustrations "DCOM Architecture" and "CORBA Achitecture" (Apr. 1997).

Hurwicz, "Multicast to the Masses: The IP multicast standard is ready, but the infrastructure isn't. Yet.," BYTE Magazine, pp. 1-10 (Jun. 1997).

Hackathorn R., "Publish or Perish, Solutions to overworked networks and unruly software distribution are just part of P&S," BYTE Magazine, pp. 1-15 (Sep. 1997).

Hackathorn, R., "Data Delivery When You Want It", BYTE Magazine, pp. 1-7 (Jun. 1997).

Hamilton (Ed.), "JavaBeans™," Sun Microsystems, Version 1.01, pp. 1-114. (Jul. 24, 1997).

Loshin, "Publish and Subscribe Meets the Internet", BYTE Magazine, pp. 1-10 (Feb. 1998).

"Managing Performance/Reliability Trade-Offs," BYTE Magazine, Review, pp. 1-2 (Feb. 1998).

"Monkey in the Middleware," BYTE Magazine, Reviews, pp. 1-2 (Feb. 1998).

Horstmann et al., "DCOM Architecture," DCOM Architecture, Microsoft Press, pp. 1-51 (Jul. 23, 1997).

The Component Object Model, "Chapter 9: Connectable Objects," Footnotes, pp. 1-12, http://www.microsoft.com/oledev/olecom/Ch09.htm. (1996).

"Event Service Specification," CORBAservices: Common Object Services Specification chapter 4, pp. 1-33 (Mar. 1995).

Data Sheet and White Paper, "TIB/Rendezvous", 17 pages (1999).

Hamilton (editor), "Events," Sun Microsystems JavaBeans™, chapter 6, pp. 24-39 (1996, 1997).

R. Limprecht, "Microsoft Transaction Server," IEEE, Compcon '97, pp. 14-18 (1997).

G. Eddon, "COM+: The Evolution of Component Services", IEEE on Computer, pp. 104,106 (Jul. 1999).

Object Transaction Services, OMG document 94.6.1, pp. 1-102, (Jun. 1994).

(No author given) "Transaction Context Objects in Microsoft Transaction Server", MSDN, (2) (Jun. 1997), pp. 1-4.

D. Chappell, "The Microsoft Transaction Server (MTS)—Transactions Meet Components", white paper, Microsoft.com, pp. 1-19 (Jun. 1997).

"Implementing Locale As Dynamically Loaded Shared Object Files", IBM Technical Disclosure Bulletin, US, IBM Corp., New York, vol. 34, No. 12, pp. 117-118 XP000308454 ISSN: 0018-8689—the whole document, May 1992.

Tripathi, A.R. et al.: Design Of A Remote Procedure Call System For Object-Oriented Distributed Programming, Software Practice & Experience, GB, Jan. 1998, John Wiley & Sons Ltd., Chichester, vol. 28, No. 1, pp. 23-47 XP000723715, ISSN: 0038-0644—the whole document.

"Java Remote Method Invocation Specification", Java Development Kit (JDK), v.1.1., Sun Microsystems, Inc., 61 pages (1996, 1997).

Barkley, "Application Engineering in Health Care," pp. 1-7 (May 9, 1995).

Orfali, Harkey, Edwards, "Client/Server Transaction Processing," Client/Server Survival Guide, pp. 241-288 (1994).

Brockschmidt, "Inside OLE," (second edition), chapter 5, pp. 219-276 and chapter 22, pp. 1011-1063 (1995).

Orfali et al., "RPC, Messaging, and Peer-to-Peer," Essential Client/Server Survival Guide chapter 9, pp. 119-128 (1994).

White Paper, "Java Remote Method Invocation-Distribution Computing For Java," pp. 1-19, java.sun.com (Nov. 11, 1999).

Chappell, "Microsoft Message Queue is a Fast, Efficient Choice for Your Distributed Application," MSJ 13:17-20, 23-24 (Jul. 1998).

Bukovec and Dievendorff, "Use MSMQ and MTS to Simplify the Building of Transactional Applications," MSJ 13:27-31, 34-36, 39-40 (Jul. 1998).

"Java Remote Method Invocation," Sun Microsystems, Inc., chapters 1-10 (155 pages) (Dec. 1997).

"Microsoft® Message Queue Server Guide," MSDN Library—Jul. 1998, pp. 1-72 (1998).

"Using the MSMQ API Functions—MSMQ Reference", MSDN Library—Jul. 1998, pp. 1-87 (1998).

"Active Objects in Hybrid," Proceedings of OOPSLA 1987, by O.M. Nierstrasz, pp. 243-253, Oct. 4-8, 1987.

Kiczales, "Going Beyond Objects for Better Separation of Concerns in Design and Implementation," Aspect-Oriented-Programming, 1997, 1998 (86 pages).

Lopes et al., "Proceedings of the Aspect-Oriented Programming Workshop of ECOOP '98," 1998 (including all 21 position papers, totaling 149 pages).

Lopes et al., "Proceedings of the Aspect-Oriented Programming Workshop at ECOOP '97," 1997 ( including all 22 position papers, total 93 pages).

Brockschmidt, "Chapter 6 Local/Remote Transparency," Inside Ole, 2d Ed., pp. 277-338 (1995).

Lam, "Building Scalable Apps," PC Tech Magazine, pp. 209-210, 212-214, (Apr. 1998).

Orfali et al., "COM:OLE's Object Bus", The Essential Distributed Objects Survival Guide, Ch. 25, pp. 429-452 (© 1996).

Orfali et al., "CORBA Services: System Management and Security," The Essential Distributed Objects Survival Guide, Ch. 10, pp. 183-202 (1996).

Hackathorn, "When information links change constantly, Publish and Subscribe promises robust data deliver" BYTE Magazine, pp. 1-8 (Jun. 1997).

Loshin, "Pull out the old and push in the new with reliable and scalable P&S middleware," BYTE Magazine, pp. 1-11 (Feb. 1998).

Matena et al., "Enterprise JavaBeans™," Version 1.0, Specification, Sun Microsystems, pp. 1-181 (Mar. 21, 1998).

"The Component Object Model: Technical Overview," Microsoft Corporation, pp. 1-17. (1996).

Seetharaman, "The CORBA Connection," Communications of the ACM, 41:10, pp. 34-36 (Oct. 1998).

Siegel, "OMG Overview: CORBA and the OMA in Enterprise Computing," Communications of the ACM, 41:10, pp. 37-43 (Oct. 1998).

Vinoski, "New features for CORBA 3.0," Communications of the ACM, 41:10, pp. 44-52 (Oct. 1998).

Schmidt, "Evaluating Architectures for Multithreaded Object Request Brokers," Communications of the ACM, 41:10, pp. 54-60 (Oct. 1998).

Henning, "Binding, Migration, and Scalability in CORBA," Communications of the ACM, 41:10, pp. 62-71 (Oct. 1998).

Haggerty et al., "The Benefits of CORBA-Based Network Management," Communications of the ACM, 41:10, pp. 73-79 (Oct. 1998).

Grimes, Chapter 7: Security, DCOM Programming: A guide to creating practical applications with Microsoft's Distributed Component Object Model, pp. 319-386, 389 (1997).

Schwartz et al., "Intel's middleware move: company ponders initiatives for common object services," Info World 20:9, pp. 1-2 (Mar. 2, 1998).

Sessions, R. COM and DCOM:Microsoft's Vision for Distributed Objects, Chapter 6, "Sharing and Scalability", pp. 249-313 (1998).

King, A., "Inside Windows™ 95," Microsoft Press, pp. 296-303 (1994).

Schroeder et al., "Performance of Firefly RPC," pp. 1-15 (Apr. 1989).

Thacker et al., "Firefly: A Multiprocessor Workstation," SRC Research Report, pp. 1-17 (Dec. 1987).

OMG, The Common Object Request Broker: Architecture and Specification, revision 2.0, chapter 2, pp. 1-17; chapter 4, pp. 12-16 (Jul. 1995).

Nance, "Balance the Load with Transaction Server," BYTE Magazine, pp. 1-8 (Jun. 1997).

McKay, "Microsoft talks up tools" InfoWorld, 20:19, 2 pp. (May 11, 1998).

Bowen, "Intel's Middleware Move," InfoWorld, vol. 20, Issue 9: 1-2, 1998.

Teegan, Network Operations and Management Symposium, IEEE, "Distributed Performance Monitoring Using SNMP V2", pp. 616-619, 1996.

Brockschmidt, "Inside OLE," (second edition), Chapter 1, "An Overview of OLE," pp. 3-60, and Part I: pp. 248-251 (1995).

Microsoft, Windows NT® Server, Server Operating System White Paper, "DCOM Technical Overview," pp. 1-43 (Apr. 1998).

Orfali et al., "RPC, Messaging, and Peer-to-Peer," Essential Client/Server Survival Guide, Chapter 22, Distributed Object Services:, pp. 367-372, 1994.

"Single-threaded Apartments", microsoft.com website, pp. 1-2, May 26, 1998.

"Using Secure RPC," MSDN Library CD, pp. 1-7, Apr. 1998.

Brown et al., "Distributed Component Object Model Protocol—DCOM/1.0," http://globecom.net/ietf/draft/draft-brown-dcom-v1-spec-03.html, pp. 1-52, Jan. 1998.

Lin, Wen-Yen and Gaudiot, Jean-Luc, "I-Structure Software Cache: A Split-Phase Transaction Runtime Cache System", pp. 122-126, © 1996 IEEE.

Tsai, Chii-Ren and Gligor, Virgil, "Distributed Audit with Secure Remote Procedure Calls", pp. 154-160, © 1991 IEEE.

Byeongseob Ki, Scivis, Java for High-Performance Network Computing, Palo Alto, CA, pp. 1-10, (Feb. 1998).

Microsoft ActiveMovie 1.0 SDK Contents, Microsoft Corporation, pp. 1-11 (1996).

Byeongseob Ki, Collaborative Scientific Data Visualization, Syracuse University, Syracuse, NY, pp. 1-10.

Brockschmidt, "Inside OLE," (second edition), chapter 24, pp. 1101-1144 (1995).

Carzaniga et al. "Design of a Scalable Event Notification Service: Interface and Architecture" University of Colorado, 1998, pp. 1-16.

Kaiser "Implementing the Real-Time Publisher/Subscriber Model on the Controller Area Network" University of Ulm, 1999, pp. 1-10.

"Object Services RFP2 Submission. Transaction Service Specification," SunSoft, Inc., Nov. 29, 1993, 36 pages.

* cited by examiner

FIG. 1
PRIOR ART

```
interface IStockEvents : IDispatch
{
    [id(1), helpstring("method StockPriceChange")]
        HRESULT StockPriceChange ( BSTR StockSymbol, double Price );

[id(2), helpstring("method NewStock")]
        HRESULT NewStock ( BSTR StockSymbol, BSTR CompanyName );
};
```

FIG. 2
PRIOR ART

```
HRESULT hr = ::CoCreateInstance(CLSID_StockSubscriber,
                NULL,
                CLSCTX_INPROC_SERVER,
                IID_IStockEvents,
                (void**)&pIStockEvents) ;

BSTR    StockSymbol = ::SysAllocString(L"MSFT");
BSTR    Company     = ::SysAllocString(L"Microsoft");

pIStockEvents->NewStock(StockSymbol, Company);
```

FIG. 9

StockPublisherEvents.h

```
#include <objbase.h>

// ----------------------------------------
//  Publisher ID
// ---------------------------------------- define str_StockPublisherName OLESTR("ESSample.StockPublisher")

const GUID guid_StockPublisherID = { /* f89859d0-6565-11d1-88c8-
0080c7d771bf */
    0xf89859d0,
    0x6565,
    0x11d1,
    {0x88, 0xc8, 0x00, 0x80, 0xc7, 0xd7, 0x71, 0xbf}
};

// ----------------------------------------
//  EventClassID is the CLSID from StockPublisher.idl
// ---------------------------------------- define str_StockEventsProgID OLESTR("ESSample.StockEvents")

// ----------------------------------------
//  EventMethods
// ---------------------------------------- define str_StockPriceChange OLESTR("StockPriceChange")

define str_NewStock       OLESTR("NewStock")
```

StockEvents.idl

```
import "oaidl.idl";
import "ocidl.idl";

// ----------------------------
// IStockEvents.idl
// ----------------------------
[
    object,
    uuid(55d81670-6567-11d1-88c8-0080c7d771bf),
    dual,
    oleautomation,
    helpstring("StockEvents Interface"),
    pointer_default(unique)
]
interface IStockEvents : IDispatch
{
    [id(1), helpstring("method StockPriceChange")]
        HRESULT StockPriceChange ( BSTR StockSymbol, double Price );

[id(2), helpstring("method NewStock")]
        HRESULT NewStock ( BSTR StockSymbol, BSTR CompanyName );
};
```

StockPublisher.idl

```
// -------------------------------------------------
//
// StockPublisher.idl
//
// ------------------------------------------------- import "oaidl.idl";
import "ocidl.idl";
import "StockEvents.idl";

// ------------------------------
// StockPublisher Type Library
// ------------------------------
[
    uuid(55d81671-6567-11d1-88c8-0080c7d771bf),
    version(1.0),
    helpstring("StockPublisher 1.0 Type Library")
]
library StockPublisherLib
{
    importlib("stdole32.tlb");
    importlib("stdole2.tlb");

[
        uuid(f89859d1-6565-11d1-88c8-0080c7d771bf),
        helpstring("StockEvents Event Class")
    ]
    coclass StockEvents
    {
        [default] interface IStockEvents;
    }
};
```

Install.cpp

```cpp
#include <objbase.h>
#include <assert.h>
#include <EventSystem.h>
#include <EventSystem_i.c>
#include "StockPublisherEvents.h"
#include "StockPublisher.h"
#include "StockPublisher_i.c"
#include "StockEvents_i.c"

int main(int argc, char* argv[])
{
        int             rc   = 0;
        HRESULT         hr   = 0;
        LPOLESTR   strGUID;

// ----------------------------------------
        // Initialize COM
        // ----------------------------------------

CoInitialize(NULL);

// ----------------------------------------
        // Instantiate the Event System
        // ----------------------------------------

IEventSystem* pIEventSystem = NULL;

hr = CoCreateInstance(CLSID_CEventSystem,
                                              NULL,
                                              CLSCTX_SERVER,
                                              IID_IEventSystem,
                                              (void**)&pIEventSystem);
        if (FAILED(hr))
        {
                wprintf(L"Failed to create CEventSystem, HRESULT=%x\n", hr);
                return (1);
        }
        wprintf(L"Successfully created CEventSystem\n");
        ...
```

```
// ----------------------------------------
// Build a publisher
// ----------------------------------------

IEventPublisher    *pIEventPublisher = NULL;

hr = CoCreateInstance(CLSID_CEventPublisher,
                                   NULL,
                                   CLSCTX_SERVER,
                                   IID_IEventPublisher,
                                   (void**)&pIEventPublisher);
if (FAILED(hr))
{
        wprintf(L"Failed to create IEventPublisher - hr = <%x>\n", hr);
        return(1);
}

BSTR bstrPublisherID;
BSTR bstrPublisherName;

hr = StringFromIID(guid_StockPublisherID, &strGUID);
bstrPublisherID = SysAllocString(strGUID);

bstrPublisherName = SysAllocString(str_StockPublisherName);

hr = pIEventPublisher->put_PublisherID(bstrPublisherID);
hr = pIEventPublisher->put_PublisherName(bstrPublisherName);

hr = pIEventSystem->Store(PROGID_EventPublisher,
pIEventPublisher);
   if (FAILED(hr))
   {
     wprintf(L"Failed to store publisher, hr = %x\n", hr);
     return 1 ;
   } pIEventPublisher->Release();
```

```
...
//------------------------------------
// Build an event class
//------------------------------------
BSTR bstrEventClassID;
BSTR bstrEventProgID;
BSTR bstrFiringIID;

IEventClass* pIEventClass = NULL;
hr = CoCreateInstance(CLSID_CEventClass,
                                NULL,
                                CLSCTX_SERVER,
                                IID_IEventClass,
                                (void**)&pIEventClass);
if (FAILED(hr))
{       wprintf(L"Failed to create IEventClass - hr = <%x>\n", hr);
        return(1); } hr = StringFromIID(CLSID_StockEvents, &strGUID);
bstrEventClassID = SysAllocString(strGUID);
bstrEventProgID = SysAllocString(str_StockEventsProgID);
hr = StringFromIID(IID_IStockEvents, &strGUID);
bstrFiringIID = SysAllocString(strGUID);
hr = pIEventClass->put_EventClassID(bstrEventClassID);
hr = pIEventClass->put_EventClassName(bstrEventProgID);
hr = pIEventClass->put_FiringInterfaceID(bstrFiringIID);

hr = pIEventSystem->Store(PROGID_EventClass, pIEventClass);
if (FAILED(hr))
{
  wprintf(L"Failed to store event, hr = %x\n", hr);
  return 1 ;
}
    pIEventClass->Release();

//------------------------------------
// Cleanup and Shutdown COM
//------------------------------------
pIEventSystem->Release();
CoUninitialize();
return rc;
}
```

FIG. 15

StockPublisher.cpp

```cpp
#include <stdio.h>
#include <objbase.h>
#include <assert.h>
#include <EventSystem.h>
#include "StockPublisher.h"
#include "StockPublisher_i.c"
#include "StockEvents_i.c"

int main(int argc, char* argv[])
{
    int         rc = 0;
    HRESULT     hr = 0;

// ----------------------------------------
    //   Initialize COM
    // ----------------------------------------
    CoInitialize(NULL);

// ----------------------------------------
    //   Instantiate the StockEvents Class
    // ----------------------------------------

IStockEvents* pIStockEvents = NULL;

hr = CoCreateInstance(CLSID_StockEvents,
                          NULL,
                          CLSCTX_SERVER,
                          IID_IStockEvents,
                          (void**)&pIStockEvents);
    if (FAILED(hr))
    {
        wprintf(L"Failed to create StockEvents, HRESULT=%x\n", hr);
        return (1);
    }
    wprintf(L"Successfully created StockEvents\n");
    ...
```

```
...
        // ----------------------------------------
        //    Fire the event
        // ----------------------------------------

BSTR bstrStockSymbol = SysAllocString(L"MSFT");
    double Price          = 154.25;

hr = pIStockEvents->StockPriceChange ( bstrStockSymbol, Price );
        if (FAILED(hr))
        {
                wprintf(L"Failed to fire event method 'StockPriceChange',
HRESULT=%x\n", hr);
                return 1;
        }

BSTR bstrNewStockSymbol = SysAllocString(L"WCE");
        BSTR bstrCompanyName    = SysAllocString(L"Wiley Coyote
Enterprises");

hr = pIStockEvents->NewStock ( bstrNewStockSymbol,
bstrCompanyName );
        if (FAILED(hr))
        {
                wprintf(L"Failed to fire event method 'NewStock', HRESULT=%x\
n", hr);
                return 1;
        }

// ----------------------------------------
        //    Cleanup
        // ---------------------------------------- pIStockEvents->Release();

// ----------------------------------------
        //    Shutdown COM
        // ----------------------------------------

CoUninitialize();
        return rc;
}
```

StockSubscription.h

```
#include <objbase.h>

// ----------------------------------------------
// Subscription Name/IDs
// ---------------------------------------------- define str_StockPriceChangeSub    OLESTR("ESSample.StockPriceChangeSub")

const GUID guid_StockPriceChangeSub = { /* 0019b161-69d9-11d1-88d1-0080c7d771bf */
    0x0019b161,
    0x69d9,
    0x11d1,
    {0x88, 0xd1, 0x00, 0x80, 0xc7, 0xd7, 0x71, 0xbf}
};

#define str_NewStockSub    OLESTR("ESSample.NewStockSub")

const GUID guid_NewStockSub = { /* 7d5b36f0-89a0-11d1-891c-0080c7d771bf */
    0x7d5b36f0,
    0x89a0,
    0x11d1,
    {0x89, 0x1c, 0x00, 0x80, 0xc7, 0xd7, 0x71, 0xbf}
};
```

```
Install.cpp

BSTR bstrSubscriptionID;
BSTR bstrSubscriptionName;
BSTR bstrPublisherID;
BSTR bstrEventClassID;
BSTR bstrMethodName;
BSTR bstrSubscriberClass;

IEventSubscription *pIEventSubscription = NULL;
hr = CoCreateInstance(CLSID_CEventSubscription,
                      NULL,
                      CLSCTX_SERVER,
                      IID_IEventSubscription,
                      (void**)&pIEventSubscription);

BSTR bstrPROGID_Subscription=
SysAllocString(PROGID_EventSubscription);
hr = StringFromIID(guid_StockPriceChangeSub, &strGUID);
bstrSubscriptionID = SysAllocString(strGUID);
bstrSubscriptionName = SysAllocString(str_StockPriceChangeSub);
hr = StringFromIID(guid_StockPublisherID, &strGUID);
bstrPublisherID = SysAllocString(strGUID);
hr = StringFromIID(CLSID_StockEvents, &strGUID);
bstrEventClassID = SysAllocString(strGUID);
bstrMethodName = SysAllocString(L"StockPriceChange");

// This is a component CLSID
BSTR bstrSubscriberCLSID =
SysAllocString(L"{C658CAB0-89A2-11D1-891C-0080C7D771BF}");

hr = pIEventSubscription->put_SubscriptionID(bstrSubscriptionID);
hr = pIEventSubscription->put_SubscriptionName(bstrSubscriptionName);
hr = pIEventSubscription->put_PublisherID(bstrPublisherID);
hr = pIEventSubscription->put_EventClassID(bstrEventClassID);
hr = pIEventSubscription->put_MethodName(bstrMethodName);
hr = pIEventSubscription->put_SubscriberCLSID(bstrSubscriberCLSID);

hr = pIEventSystem->Store(bstrPROGID_Subscription,pIEventSubscription);

pIEventSubscription->Release();
```

```
// -----------------------------------------------------------
//  IEventSystem
// ----------------------------------------------------------- interface IEventSystem : IDispatch
{
        HRESULT Query([in] BSTR progID,
                      [in] BSTR queryCriteria,
                      [out] int* errorIndex,
                      [out,retval] IUnknown** ppInterface);

HRESULT Store([in] BSTR ProgID,
                      [in] IUnknown* pInterface);

HRESULT Remove([in] BSTR progID,
                       [in] BSTR queryCriteria,
                       [out] int* errorIndex);

HRESULT EventObjectChangeEventClassID(
                       [out,retval] BSTR* pbstrEventClassID);

HRESULT QueryS([in] BSTR progID,
                       [in] BSTR queryCriteria,
                       [out,retval] IUnknown** ppInterface);

HRESULT RemoveS([in] BSTR progID,
                        [in] BSTR queryCriteria);

```
// ----------------------------------------------------------
//   IEventPublisher -- event publishers
// ---------------------------------------------------------- interface IEventPublisher : IDispatch
{
        HRESULT PublisherID([out,retval] BSTR* pbstrPublisherID);
        HRESULT PublisherID([in] BSTR bstrPublisherID);

HRESULT PublisherName([out,retval] BSTR* pbstrPublisherName);
        HRESULT PublisherName([in] BSTR bstrPublisherName);

HRESULT PublisherType([out,retval] BSTR* pbstrPublisherType);
        HRESULT PublisherType([in] BSTR bstrPublisherType);

HRESULT OwnerSID([out,retval] BSTR* pbstrOwnerSID);
        HRESULT OwnerSID([in] BSTR bstrOwnerSID);

HRESULT Description([out,retval] BSTR* pbstrDescription);
        HRESULT Description([in] BSTR bstrDescription);

HRESULT GetDefaultProperty([in] BSTR bstrPropertyName,
                [out,retval] VARIANT* propertyValue);
        HRESULT PutDefaultProperty([in] BSTR bstrPropertyName,
                [in] VARIANT* propertyValue);
        HRESULT RemoveDefaultProperty([in] BSTR bstrPropertyName);
        HRESULT GetDefaultPropertyCollection(
                [out,retval] IEventObjectCollection** collection);

HRESULT Security([out,retval] IEventObjectACL** pAcl);
        HRESULT Security([in] IEventObjectACL* acl);
};
```

```
// ----------------------------------------------------------------
// IEventClass -- event component
// ---------------------------------------------------------------- interface IEventClass : IDispatch
{
        HRESULT EventClassID([out,retval] BSTR* pbstrEventClassID);
        HRESULT EventClassID([in] BSTR bstrEventClassID);

HRESULT EventClassName([out,retval] BSTR* pbstrEventClassName);
        HRESULT EventClassName([in] BSTR bstrEventClassName);

HRESULT OwnerSID([out,retval] BSTR* pbstrOwnerSID);
        HRESULT OwnerSID([in] BSTR bstrOwnerSID);

HRESULT FiringInterfaceID([out,retval] BSTR* pbstrFiringInterfaceID);
        HRESULT FiringInterfaceID([in] BSTR bstrFiringInterfaceID);

HRESULT Description([out,retval] BSTR* pbstrDescription);
        HRESULT Description([in] BSTR bstrDescription);

HRESULT CustomConfigCLSID([out,retval] BSTR*
               pbstrCustomConfigCLSID);
        HRESULT CustomConfigCLSID([in] BSTR bstrCustomConfigCLSID);

HRESULT TypeLib([out,retval] BSTR* pbstrTypeLib);
        HRESULT TypeLib([in] BSTR bstrTypeLib);

HRESULT Security([out,retval] IEventObjectACL** pAcl);
        HRESULT Security([in] IEventObjectACL* acl);
};
```

```
// ----------------------------------------------------------------
//   IEventSubscription -- event system subscriptions
// ----------------------------------------------------------------
interface IEventSubscription : IDispatch
{   HRESULT SubscriptionID([out,retval] BSTR* pbstrSubscriptionID);
    HRESULT SubscriptionID([in] BSTR bstrSubscriptionID);
    HRESULT SubscriptionName([out,retval] BSTR* pbstrSubscriptionName);
    HRESULT SubscriptionName([in] BSTR bstrSubscriptionName);
    HRESULT PublisherID([out,retval] BSTR* pbstrPublisherID);
    HRESULT PublisherID([in] BSTR bstrPublisherID);
    HRESULT EventClassID([out,retval] BSTR* pbstrEventClassID);
    HRESULT EventClassID([in] BSTR bstrEventClassID);
    HRESULT MethodName([out,retval] BSTR* pbstrMethodName);
    HRESULT MethodName([in] BSTR bstrMethodName);
    HRESULT SubscriberCLSID([out,retval] BSTR* pbstrSubscriberCLSID);
    HRESULT SubscriberCLSID([in] BSTR bstrSubscriberCLSID);
    HRESULT SubscriberInterface(
        [out,retval] IUnknown** ppSubscriberInterface);
    HRESULT SubscriberInterface([in] IUnknown* pSubscriberInterface);
    HRESULT PerUser([out,retval] BOOL* pfPerUser);
    HRESULT PerUser([in] BOOL fPerUser);
    HRESULT OwnerSID([out,retval] BSTR* pbstrOwnerSID);
    HRESULT OwnerSID([in] BSTR bstrOwnerSID);
    HRESULT Enabled([out,retval] BOOL* pfEnabled);
    HRESULT Enabled([in] BOOL fEnabled);
    HRESULT Description([out,retval] BSTR* pbstrDescription);
    HRESULT Description([in] BSTR bstrDescription);
    HRESULT MachineName([out,retval] BSTR* pbstrMachineName);
    HRESULT MachineName([in] BSTR bstrMachineName);
    HRESULT GetPublisherProperty([in] BSTR bstrPropertyName,
        [out,retval] VARIANT* propertyValue);
    HRESULT PutPublisherProperty([in] BSTR bstrPropertyName,
        [in] VARIANT* propertyValue);
    HRESULT RemovePublisherProperty([in] BSTR bstrPropertyName);
    HRESULT GetPublisherPropertyCollection(
        [out,retval] IEventObjectCollection** collection);
    HRESULT GetSubscriberProperty([in] BSTR bstrPropertyName,
        [out,retval] VARIANT* propertyValue);
    HRESULT PutSubscriberProperty([in] BSTR bstrPropertyName,
        [in] VARIANT* propertyValue);
    HRESULT RemoveSubscriberProperty([in] BSTR bstrPropertyName);
    HRESULT GetSubscriberPropertyCollection(
        [out,retval] IEventObjectCollection** collection);
    HRESULT Security([out,retval] IEventObjectACL** pAcl);
    HRESULT Security([in] IEventObjectACL* acl);  };
```

```
//----------------------------------------------------------------
//  IFiringControl
//----------------------------------------------------------------
interface IFiringControl : IDispatch
{
        HRESULT FireSubscription([in] IEventSubscription* subscription);
};
```
234

FIG. 26

```
//----------------------------------------------------------------
//  IPublisherFilter
//---------------------------------------------------------------- interface IPublisherFilter : IUnknown
{
    HRESULT Initialize([in] BSTR methodName,
        [in,unique] IDispatch* dispUserDefined);

HRESULT PrepareToFire([in] BSTR methodName,
        [in] IFiringControl* firingControl);
};
```
235

FIG. 27

```
//----------------------------------------------------------------
//  ISubscriberControl
//---------------------------------------------------------------- interface ISubscriberControl : IUnknown
{
        HRESULT PreEventCall([in] IEventSubscription* pISubscription);
};
```
236

FIG. 28

```
// --------------------------------------------------------------
//   IEventObjectChange
// --------------------------------------------------------------
interface IEventObjectChange : IUnknown
{
    typedef enum {
            EOC_NewObject,
            EOC_ModifiedObject,
            EOC_DeletedObject
    } EOC_ChangeType;

HRESULT ChangedSubscription([in] EOC_ChangeType changeType,
        [in] BSTR bstrSubscriptionID);

HRESULT ChangedEventClass([in] EOC_ChangeType changeType,
        [in] BSTR bstrEventClassID);

HRESULT ChangedPublisher([in] EOC_ChangeType changeType,
        [in] BSTR bstrPublisherID);
};
```

```
//-----------------------------------------------------------------
// IEnumEventObject -- An interface that provides an enumeration of an
//                     EventClass, Publisher, or Subscription object.
//-----------------------------------------------------------------
interface IEnumEventObject : IUnknown
{
    HRESULT Clone([out] IEnumEventObject** ppInterface);
    HRESULT Next([in] ULONG cReqElem,
        [out,size_is(cReqElem), length_is(*cRetElem)] IUnknown** ppInterface,
        [out] ULONG* cRetElem);
    HRESULT Reset();
    HRESULT Skip([in] ULONG cSkipElem);
};

interface IEventObjectCollection : IDispatch
{
    HRESULT _NewEnum([out,retval] IUnknown** ppUnkEnum);
    HRESULT Item([in] BSTR objectID, [out,retval] VARIANT* pItem);
    HRESULT NewEnum([out,retval] IEnumEventObject** ppEnum);
    HRESULT Count([out,retval] long* pCount);
    HRESULT Add([in] VARIANT* item, [in] BSTR objectID);
    HRESULT Remove([in] BSTR objectID);
}
```

```
//-----------------------------------------------------------------
// IEventProperty -- An interface that represents a name/property pair.
//-----------------------------------------------------------------
interface IEventProperty : IDispatch
{
        HRESULT Name([out,retval] BSTR* propertyName);
        HRESULT Name([in] BSTR propertyName);

HRESULT Value([out,retval] VARIANT* propertyValue);
        HRESULT Value([in] VARIANT* propertyValue);
};
```

```
// ----------------------------------------------------------------
//   IEventControl
// ----------------------------------------------------------------
interface IEventControl : IDispatch
{
    HRESULT SetPublisherFilter([in] BSTR methodName,
        [in,unique] IPublisherFilter* pPublisherFilter);

HRESULT AllowInprocActivation(
        [out,retval] BOOL* pfAllowInprocActivation);
    HRESULT AllowInprocActivation([in] BOOL fAllowInprocActivation);

HRESULT GetSubscriptions([in] BSTR methodName,
        [in,unique] BSTR optionalCriteria,
        [in,unique] int* optionalErrorIndex,
        [out,retval] IEventObjectCollection** ppCollection);
    HRESULT SetDefaultQuery([in] BSTR methodName,
        [in] BSTR criteria,
        [out,retval] int* errorIndex);
};
```

242
```
#define PROGID_EventPublisher OLESTR("EventSystem.EventPublisher")
#define PROGID_EventClass    OLESTR("EventSystem.EventClass")
#define PROGID_EventSubscription
OLESTR("EventSystem.EventSubscription")
#define PROGID_EventPublisherCollection
OLESTR("EventSystem.EnumPublisher")
#define PROGID_EventClassCollection
OLESTR("EventSystem.EnumEventClass")
#define PROGID_EventSubscriptionCollection
OLESTR("EventSystem.EnumSubscription")
```

FIG. 33

244
```
HRESULT         hr;
Int             ErrorIndex;
IEventObjectCollection* pSubscriptionCollection;

hr = IEventSystem.Query ( PROGID_EventSubscriptionCollection,
                    L"ALL",
                    &ErrorIndex,
                    &pSubscriptionCollection );

hr = IEventSystem.Query ( PROGID_EventSubscriptionCollection,
                    L"EventClassID == {F89859D1-6565-11D1-88C8-
0080C7D771BF}",
                    &ErrorIndex,
                    &pSubscriptionCollection );

hr = IEventSystem.Query ( PROGID_EventSubscriptionCollection,
                    L"EventClassID == {F89859D1-6565-11D1-88C8-
0080C7D771BF} AND MethodName = 'StockPriceChange'",
                    &ErrorIndex,
                    &pSubscriptionCollection );
```

FIG. 36

254 —
```
IEventControl*   pIEventControl = NULL;

hr = pIStockEvents->QueryInterface(
          IID_IEventControl, (void **)&pIEventControl);

hr = pIEventControl->SetPublisherFilter(
          L"StockPriceChange",
          pIStockEventsFilter);
```

OBJECT CONNECTIVITY THROUGH LOOSELY COUPLED PUBLISH AND SUBSCRIBE EVENTS

RELATED APPLICATION DATA

This application is a continuation of U.S. patent application Ser. No. 10/955,975 filed Sep. 29, 2004, which is a continuation of U.S. patent application Ser. No. 09/257,363 filed Feb. 23, 1999, now U.S. Pat. No. 6,829,770, issued Dec. 7, 2004.

TECHNICAL FIELD

The present invention relates to communicating information in a distributed objects system, and more particularly relates to a publish and subscribe event communications object model and services for delivering events between loosely coupled objects.

BACKGROUND OF THE INVENTION

A prevalent programming problem is that of advertising availability of and distributing information to interested parties without a prior knowledge of their identity. In these situations, there are two types of programs involved: a program that produces information and one or more programs that consume the information. For efficiency, it is preferable that the information producer proactively notify the interested information consumers when information becomes available, rather than force the consumer to repeatedly call or poll for available information. Yet, the identity of the consumers is not known a priori by the producer (e.g., at development or compile time of the producer program). This programming problem is encountered in a variety of situations from delivering information between very granular objects running in a single process to delivering information across an enterprise between very large applications. For example, it may be desirable to inform several thousand employees of an enterprise when its stock price reaches a given amount, or inform managers when certain tasks in a project are complete, among many other information distribution scenarios. Also, a number of network or enterprise events are of interest to many applications, such as changes in network security policy, replication failures, network printer failure, or moving server software to a new machine. There also are a large number of events that occur within a single machine and have great utility, including login/logout, network connect/disconnect, startup/shutdown, disk full, CPU idle, etc.

Traditional object-oriented programming models and systems use method calls according to a request/reply model to communicate data between objects. Object-oriented programming models, such as the Microsoft Component Object Model ("COM"), define a standard structure of software objects that can be interconnected and collectively assembled into an application (which, being assembled from component objects, is herein referred to as a "component application"). The objects are hosted in an execution environment created by system services, such as the object execution environments provided by COM. This system exposes services for use by component application objects in the form of application programming interfaces ("APIs"), system-provided objects and system-defined object interfaces.

In accordance with object-oriented programming principles, the component application is a collection of object classes which each model real world or abstract items by combining data to represent the item's properties with functions to represent the item's functionality. More specifically, an object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class.

These object-oriented programming models traditionally use a request/reply model to communicate data between objects. In the request/reply model, one object (typically the object that consumes or acts on the information) implements an incoming interface. FIG. 1, for example, shows a program listing 10 according to COM of an "IStockEvents" interface exposed by an object to receive communications of stock information, such as stock symbols and price updates. A client of the object (such as one that produces information acted on by the object) communicates with the object through the incoming interface, by first creating the object and calling a method in the interface of the object. FIG. 2, for example, shows a program listing 12 of client code to communicate stock information to the object by calling a method in the IStockEvents interface. In such request/reply models, however, there is a one-to-one relationship between the client and object. Also, the identity of the object must be "known" a priori to the client. Specifically, the relationship of client to object is "early-bound," i.e., established at development by compiling in a class identifier (e.g., shown in FIG. 2 by the "CLSID_StockSubscriber" parameter of the "CoCreateInstance( )" call).

A more effective approach to this distribution problem (i.e., of many unknown consumers) is to use a publish and subscribe event communications model, which generally provides an information distribution mechanism that in many ways resembles the magazine publishing industry. In magazine publishing, a publisher (e.g., McGraw-Hill) advertises magazines (e.g., Byte magazine) to potential subscribers. Subscriptions to a given magazine are placed by the subscriber or possibly also by another person on behalf of the subscriber. The subscription is an agreement by the publisher to distribute an event (e.g., issues of the magazine) to the subscriber when the event is produced by the publisher. Publish and subscribe event communications models use a similar approach for distributing information from a producing program (the "publisher") to a consuming program (the "subscriber").

Two representative publish and subscribe event communications models are Sun Microsystems' JavaBeans™ Events architecture and the Connection Points model of Microsoft Corporation's Component Object Model (hereafter, COM Connection Points). Both of these feature an internal events model in which the eventing semantic is completely contained within the scope of the publisher and subscriber. In other words, the subscriber contains the program code that implements the subscription logic.

More specifically, JavaBeans™ Events defines structures of a set of interfaces to be implemented by the publisher and subscriber, as well as an event object with standard interfaces. The publisher (called an "event source") identifies itself as sourcing particular events by implementing registration methods that conform to a specific design pattern (e.g., declared as "FooListener AddFooListener(FooListener fel);" in the Java programming language) and accept references to instances of particular subscriber's (called an "event listener") interfaces. The information produced by the event source is encapsulated in an "event state" object (which is derived as a subclass from "java.util.EventObject"). The subscriber identifies itself as interested in particular events by implementing some set of "event listener" interfaces with methods that receive the event state object. The subscriber must include code to call the registration method of the publisher and pass a reference to its event listener interface. The publisher, on the other hand, contains code that, upon producing information which is to be published, creates an event state object to contain the information and calls an appropriate method on the registered event listener interfaces of the event listener to which the event state object is passed.

In COM Connection Points, a publisher (called a "connectable object") defines outgoing interfaces and provides an associated "connection point" sub-object for distributing information to interested "client objects" or subscribers. The connectable object implements an interface, "IConnectionPointContainer," which indicates the existence of outgoing interfaces. The client object uses the "IConnectionPointContainer" interface to obtain a reference to an interface, "IConnectionPoint," of the connection point sub-object for a desired outgoing interface (specified by an interface identifier or "IID") defined by the connectable object. Using the "IConnectionPoint" interface, the client object establishes an advisory connection with the connectable object by passing in a reference to a sink object that implements the desired outgoing interface. The connectable object then publishes an event via calls to the connected outgoing interfaces.

In both the JavaBeans™ Events and COM Connection Points models, the subscriber is required to contain "subscription logic" (i.e., program code) that establishes the subscription or connection from the publisher to the subscriber. In JavaBeans™ Events, the event listener contains logic to locate the appropriate event source that produces event state objects with desired information, and to register its event listener interface with that event source so as to receive the event state object. In COM Connection Points, the client object contains logic to locate the appropriate connectable object that produces desired information, and establish an advisory connection with the connectable object to the client object's sink interface. This need in such internal event models to incorporate subscription logic built into the publisher and/or subscriber complicates the programming model, making it more difficult for developers to write application objects that make use of the event model for information distribution.

A further disadvantage of these event communications models is that the publisher and subscriber are required to have concurrent lifetimes. In JavaBeans™ Events, the event listener registers an "event listener" interface reference with the event source. In COM Connection Points, the client object passes a sink object interface reference to the connection point object to establish the advisory connection from the connectable object. In either case, the interface reference is only valid during the lifetime of the event listener or client sink object, requiring that the subscriber and publisher be in existence (i.e., instantiated) when the subscription is made and when the event is published.

SUMMARY OF THE INVENTION

The present invention provides a publish and subscribe event communications model in which, among other features, subscribers are externally and loosely coupled to publishers. The event communication model is external in that subscriptions are maintained outside the publisher and subscriber by an event system, so that much of the eventing semantic is removed from the publisher and subscriber. The model also loosely couples the subscriber and the publisher in that the subscriptions are persistent, and the publisher and the subscriber need not have matching lifetimes. In particular, the subscription can be built prior to either the publisher or the subscriber being loaded and running. Further, the subscriber need not be loaded and running when the publisher generates an event, and the publisher need not be loaded and running when the event is delivered to the subscriber.

In an embodiment of the invention illustrated herein, an event is a call to a "subscribeable" method—one which can be subscribed to by a subscriber. The publisher defines an object called an event class, which exposes an interface having methods that are "subscribeable" and whose implementation is supplied by the event system. The defined event classes are stored in an events store. Subscriptions can be built for methods in the interfaces of event classes in the events store. The subscriptions specify which subscriber(s) to call whenever a call is made to the subscribed event class method. The subscribers also expose an interface matching the event class interface that contains the subscribed method.

The publisher publishes an event by creating an instance of an event class which exposes the same interface as the subscribers that are to receive the event, and then calling a method in the event class interface. The implementation of the method in the event class issues a counterpart call to every subscriber having a subscription to the event class method. The event class method makes the counterpart call to the matching method and interface of the subscriber.

This event communications model offers several advantages. First, the characteristic of the illustrated event communications model that events are method calls allows event publishing semantics to be removed from the publisher. The publisher issues or "fires" events by simply making a method call, just like a client using request/reply semantics in a traditional object-oriented programming model. Such clients thus can assume the role of a publisher in the illustrated event communications model without alteration. Further, the publisher need not implement event handling code.

The illustrated event communications model has event-handling and subscription code automatically supplied by the event system in an external intermediary, i.e., the event class. This allows the publishing and subscribing of events to be handled in and by system infrastructure, which facilitates easier development of applications using the event model.

The illustrated event communications model also has subscriptions that can be coupled to a subscriber via a class identifier or like program identifier, rather than by an interface pointer or other link to a running program instance. This allows the subscriber's lifetime to be independent of the publisher and the subscription. The subscriber can be activated (e.g., loaded and run) at the time an event is distributed, and need not exist prior to the event—including at the creation of the subscription.

The illustrated event communications model further has subscriptions maintained by the event system externally from the publisher and the subscriber. This allows the subscriptions to be placed independent of the publisher and subscriber lifetimes. Since the publisher does not track subscriptions to its events, the publisher need not exist for subscriptions to be placed to the events produced by the publisher.

The illustrated event communications model yet further loosely couples the publisher to its subscriptions and subscribers through use of a class identifier or like program identifier of an event class, rather than interface pointers or like links to running subscribers or subscriptions. This also serves to separate the subscriber and subscription's lifetimes from the publisher's lifetime. The publisher issues events to the subscribers for previously placed subscriptions (i.e., subscriptions built prior to the publisher's existence) by creating an instance of the appropriate event class, and issuing method calls to its interfaces. The event class then multicasts the events to the established subscribers for the event.

The illustrated event communications model additionally maintains persistent subscriptions. Subscriptions are stored by the events system in persistent storage. The subscriptions thus can survive interruptions in machine operation. Also, subscribers can be deactivated after placing a subscription, and later activated when an event is fired.

The illustrated event communications model also permits subscriptions to be placed by other than the subscriber (herein called "gift subscriptions"), such as by an administrative utility and other programs. This allows previously developed objects or object developed by another party to become subscribers by integrating the subscriber objects with other application objects that place the subscription or by an administrator using an administrative utility program to configure the objects as subscribers.

Additional features and advantages of the invention will be made apparent from the following detailed description of an illustrated embodiment which proceeds with reference to the accompanying drawings.

BRIEF DESCRIPTION OF THE DRAWINGS

FIG. 1 is a program listing of an exemplary incoming interface of an object according to a prior art request/reply communications model using the Microsoft Component Object Model (COM).

FIG. 2 is a program listing of exemplary client code for creating the object and calling a method in the incoming interface of FIG. 1.

FIG. 9 is a program listing of a header file with a publisher identifier in an exemplary "Stock Exchange" application using the illustrated event communications model of FIG. 5.

FIG. 10 is a program listing of an outgoing event interface definition in the exemplary "Stock Exchange" application using the illustrated event communications model of FIG. 5.

FIG. 11 is a program listing of a type library in the exemplary "Stock Exchange" application using the illustrated event communications model of FIG. 5.

FIGS. 12, 13, and 14 are a program listing of an installation program in the exemplary "Stock Exchange" application for storing the publisher and event class objects in the event system of the illustrated event communications model of FIG. 5.

FIGS. 15 and 16 are a program listing of publisher code in the exemplary "Stock Exchange" application using the illustrated event communications model of FIG. 5.

FIG. 18 is a program listing of a header file with a subscription identifier in the exemplary "Stock Exchange" application using the illustrated event communications model of FIG. 5.

FIG. 19 is a program listing of an installation program in the exemplary "Stock Exchange" application for storing the subscription with the event services of FIG. 7 in the illustrated event communications model of FIG. 5.

FIG. 21 is a program listing of an event system interface definition in the illustrated event communications model of FIG. 5.

FIG. 22 is a program listing of an event publisher interface definition in the illustrated event communications model of FIG. 5.

FIG. 23 is a program listing of an event class interface definition in the illustrated event communications model of FIG. 5.

FIG. 24 is a program listing of an event subscription interface definition in the illustrated event communications model of FIG. 5.

FIG. 25 is a program listing of a firing control interface definition in the illustrated event communications model of FIG. 5.

FIG. 26 is a program listing of a publisher filter interface definition in the illustrated event communications model of FIG. 5.

FIG. 27 is a program listing of a subscriber control interface definition in the illustrated event communications model of FIG. 5.

FIG. 28 is a program listing of an event object change interface definition in the illustrated event communications model of FIG. 5.

FIG. 29 is a program listing of an event object enumerator interface definition in the illustrated event communications model of FIG. 5.

FIG. 30 is a program listing of an event property interface definition in the illustrated event communications model of FIG. 5.

FIG. 31 is a program listing of an event control interface definition in the illustrated event communications model of FIG. 5.

FIG. 32 is a header file program listing of program identifiers of types of event system objects in the illustrated event communications model of FIG. 5.

FIG. 33 is a program listing of example event object retrieval queries using the "Query( )" method of the event system interface of FIG. 21.

FIG. 36 is a program listing of code in the publisher to install the publisher filter object of FIG. 34.

DETAILED DESCRIPTION OF THE INVENTION

Figure 3:
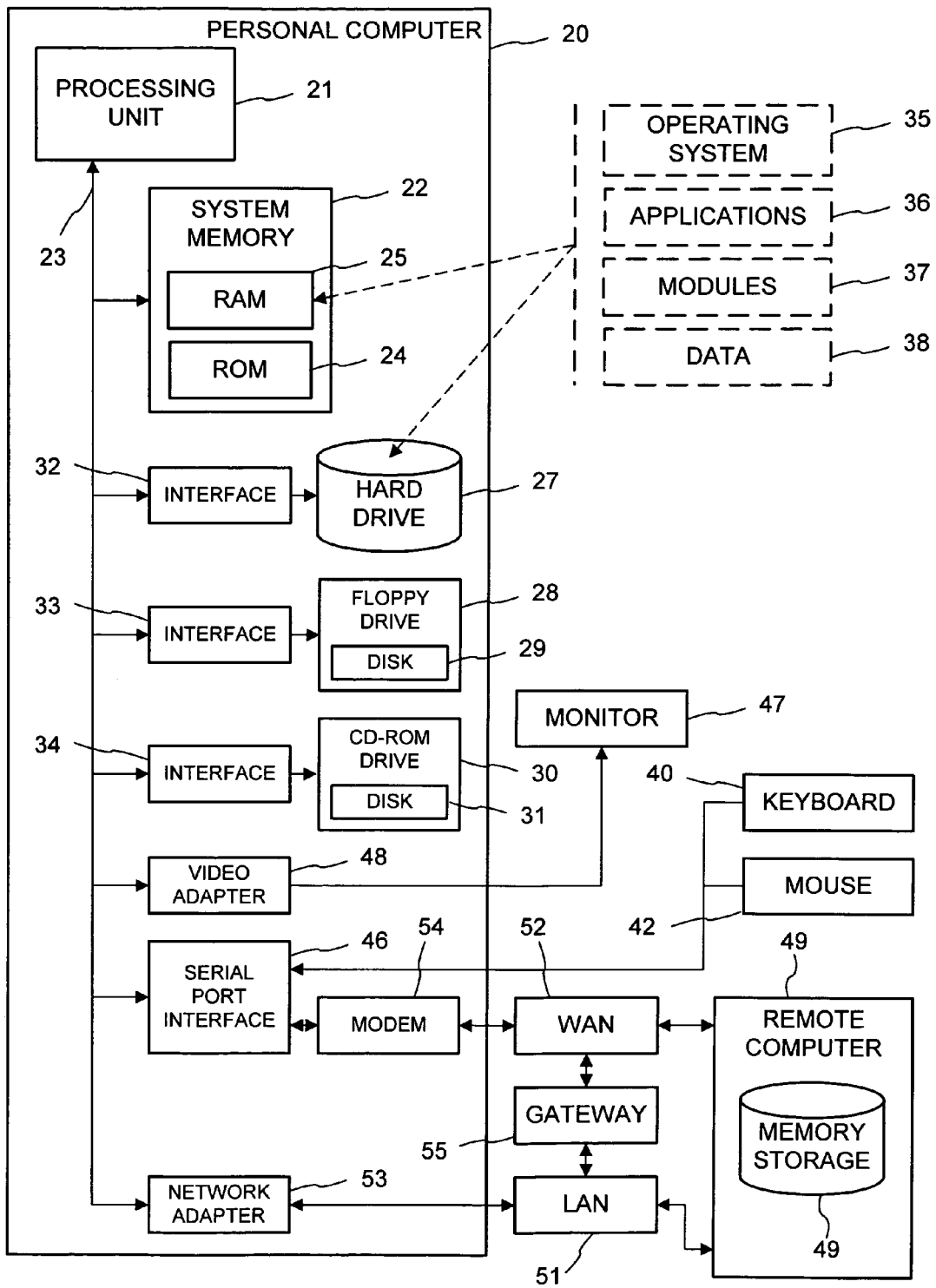
FIG. 3 is a block diagram of a computer system that may be used to implement a method and apparatus embodying the invention for object execution environment extensibility.

The present invention is directed toward a publish and subscribe event communications model for more effectively advertising availability of and distributing information to interested parties without a priori knowledge of their identity. In one embodiment illustrated herein, the invention is incorporated into an object services component, entitled "COM+," of an operating system, entitled "Microsoft Windows NT Server 5.0," marketed by Microsoft Corporation of Redmond, Wash. Briefly described, this software is a scaleable, high-performance network and computer operating system supporting distributed client/server computing, and providing an object execution environment for component applications conforming to COM. The COM+ component incorporates object services that implement the illustrated publish and subscribe event communication model according to the invention. In the following discussion, "COM" is used to refer to the object model defined in the Microsoft Component Object Model, whereas "COM+" refers to the system services, system-provided objects and system-defined interfaces of the COM+ object services component of Microsoft Windows NT 5. The part of COM+ that implements the illustrated publish and subscribe event communications model is hereafter referred to as the "COM+ Events" system.

Exemplary Operating Environment

FIG. 1 and the following discussion are intended to provide a brief, general description of a suitable computing environment in which the invention may be implemented. While the invention will be described in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The illustrated embodiment of the invention also is practiced in distributed computing environments where tasks are performed by remote processing devices that are linked through a communications network. But, some embodiments of the invention can be practiced on stand alone computers. In a distributed computing environment, program modules may be located in both local and remote memory storage devices.

With reference to FIG. 1, an exemplary system for implementing the invention includes a conventional computer 20 (such as personal computers, laptops, palmtops, set-tops, servers, mainframes, and other variety computers), including a processing unit 21, a system memory 22, and a system bus 23 that couples various system components including the system memory to the processing unit 21. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 21.

The system bus may be any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 24 and random access memory (RAM) 25. A basic input/output system (BIOS), containing the basic routines that help to transfer information between elements within the computer 20, such as during start-up, is stored in ROM 24.

The computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of data, data structures, computer-executable instructions, etc. for the computer 20. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38.

A user may enter commands and information into the computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. The remote computer 49 may be a server, a router, a peer device or other common network node, and typically includes many or all of the elements described relative to the computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications (e.g., via the LAN 51 and a gateway or proxy server 55) over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In accordance with the practices of persons skilled in the art of computer programming, the present invention is described below with reference to acts and symbolic representations of operations that are performed by the computer 20, unless indicated otherwise. Such acts and operations are sometimes referred to as being computer-executed. It will be appreciated that the acts and symbolically represented operations include the manipulation by the processing unit 21 of electrical signals representing data bits which causes a resulting transformation or reduction of the electrical signal representation, and the maintenance of data bits at memory locations in the memory system (including the system memory 22, hard drive 27, floppy disks 29, and CD-ROM 31) to thereby reconfigure or otherwise alter the computer system's operation, as well as other processing of signals. The memory locations where data bits are maintained are physical locations that have particular electrical, magnetic, or optical properties corresponding to the data bits.

Component Application Object Overview

Figure 4:
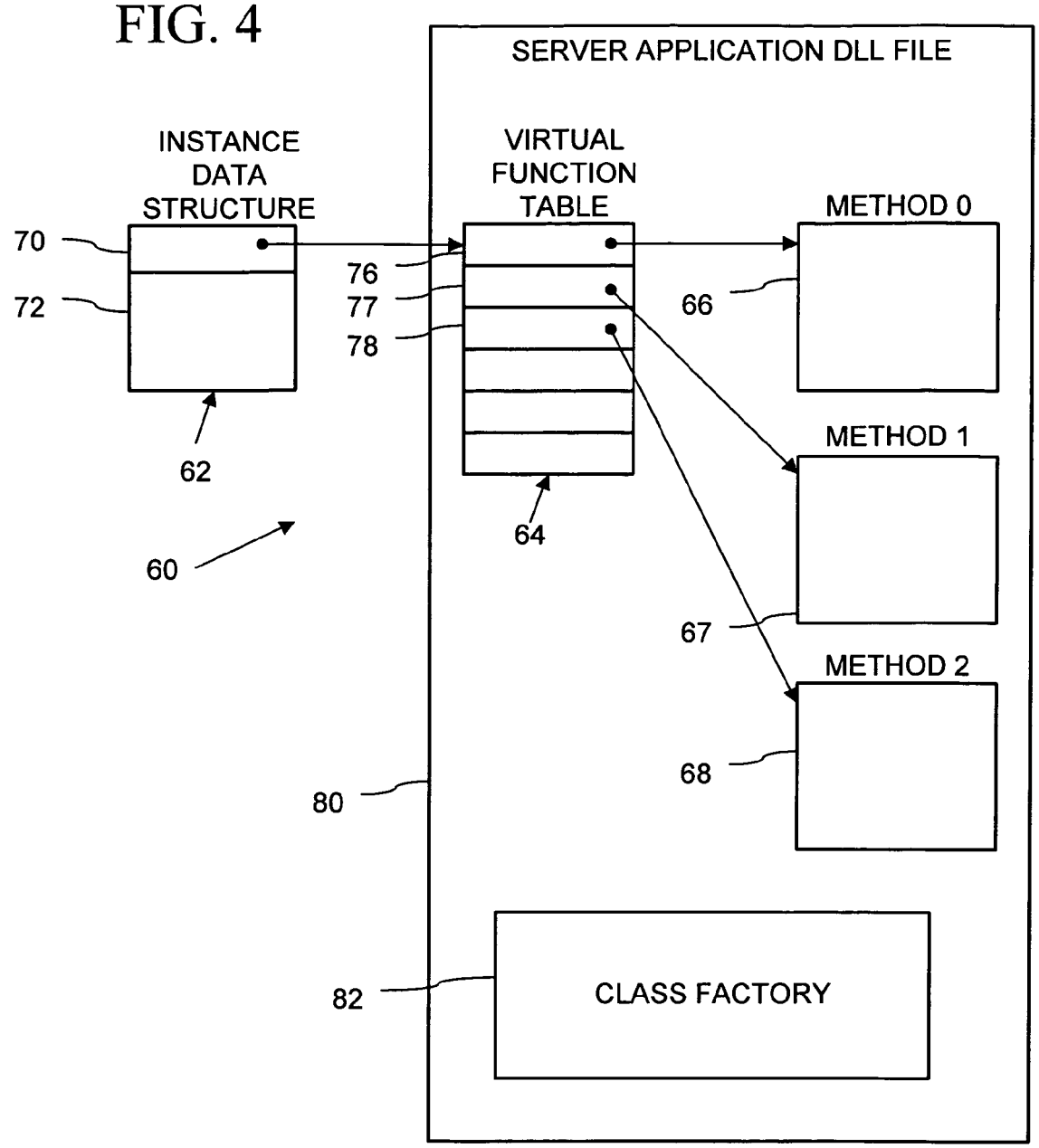
FIG. 4 is a block diagram of a component application object.

With reference now to FIG. 4, the computer 20 (FIG. 1) executes component applications that are developed as a package of component application objects. In the illustrated embodiment of the invention, the component application objects conform to the Microsoft Component Object Model ("COM") specification (i.e., are implemented as a "COM Object" 60) and executed using the COM+ services of the Microsoft Windows NT Server 5.0 operating system as stated above, but alternatively may be implemented according to other object standards (including the CORBA (Common Object Request Broker Architecture) specification of the Object Management Group) and executed under object services of another operating system. The COM specification defines binary standards for objects and their interfaces which facilitate the integration of software components into applications. (For a detailed discussion of COM and OLE, see Kraig Brockschmidt, *Inside OLE, Second Edition*, Microsoft Press, Redmond, Wash. (1995)).

In accordance with COM, the COM object 60 is represented in the computer system 20 (FIG. 1) by an instance data structure 62, a virtual function table 64, and member methods (also called member functions) 66-68. The instance data structure 62 contains a pointer 70 to the virtual function table 64 and data 72 (also referred to as data members, or properties of the object). A pointer is a data value that holds the address of an item in memory. The virtual function table 64 contains entries 76-78 for the member methods 66-68. Each of the entries 76-78 contains a reference to the code 66-68 that implements the corresponding member methods.

The pointer 70, the virtual function table 64, and the member methods 66-68 implement an interface of the COM object 60. By convention, the interfaces of a COM object are illustrated graphically as a plug-in jack as shown for the component application objects 110-118 in FIG. 5. Also, interfaces conventionally are given names beginning with a capital "I." In accordance with COM, the COM object 60 can include multiple interfaces, which are implemented with one or more virtual function tables. The member function of an interface is denoted as "IInterfaceName::MethodName."

The virtual function table 64 and member methods 66-68 of the COM object 60 are provided by an object server program 80 (hereafter "object server DLL") which is stored in the computer 20 (FIG. 1) as a dynamic link library file (denoted with a ".dll" file name extension). In accordance with COM, the object server DLL 80 includes code for the virtual function table 64 and member methods 66-68 of the classes that it supports, and also includes a class factory 82 that generates the instance data structure 62 for an object of the class.

Other objects and programs (referred to as a "client" of the COM object 60) access the functionality of the COM object by invoking the member methods through the COM object's interfaces. First however, the COM object must be instantiated (i.e., by causing the class factory to create the instance data structure 62 of the object); and the client must obtain an interface pointer to the COM object.

Before the COM object 60 can be instantiated, the object is first installed on the computer 20. Typically, installation involves installing a group of related objects called a package. The COM object 60 is installed by storing the object server DLL file(s) 80 that provides the object in data storage accessible by the computer 20 (typically the hard drive 27, shown in FIG. 1), and registering COM attributes (e.g., class identifier, path and name of the object server DLL file 80, etc.) of the COM object in the system registry. The system registry is a configuration database.

A client requests instantiation of the COM object using system-provided services and a set of standard, system-defined component interfaces based on class and interface identifiers assigned to the COM Object's class and interfaces. More specifically, the services are available to client programs as application programming interface (API) functions provided in the COM+ library, which is a component of the Microsoft Windows NT Server 5.0 operating system in a file named "OLE32.DLL." Also in COM+, classes of COM objects are uniquely associated with class identifiers ("CLSIDs"), and registered by their CLSID in a system configuration database referred to as the "registry." The registry entry for a COM object class associates the CLSID of the class with information identifying an executable file that provides the class (e.g., a DLL file having a class factory to produce an instance of the class). Class identifiers are 128-bit globally unique identifiers ("GUIDs") that the programmer creates with a COM+ service named "CoCreateGUID" (or any of several other APIs and utilities that are used to create universally unique identifiers) and assigns to the respective classes. The interfaces of a component additionally are associated with interface identifiers ("IIDs").

In particular, the COM+ library provides an API function, "CoCreateInstance( )," that the client program can call to request creation of a component using its assigned CLSID and an IID of a desired interface. In response, the "CoCreateInstance( )" API looks up the registry entry of the requested CLSID in the registry to identify the executable file for the class. The "CoCreateInstance( )" API function then loads the class' executable file, and uses the class factory in the executable file to create an instance of the COM object 60. Finally, the "CoCreateInstance( )" API function returns a pointer of the requested interface to the client program. The "CoCreateInstance( )" API function can load the executable file either in the client program's process, or into a server process which can be either local or remote (i.e., on the same computer or a remote computer in a distributed computer network) depending on the attributes registered for the COM object 60 in the system registry.

Once the client of the COM object 60 has obtained this first interface pointer of the COM object, the client can obtain pointers of other desired interfaces of the component using the interface identifier associated with the desired interface. COM+ defines several standard interfaces generally supported by COM objects including the "IUnknown" interface. This interface includes a member function named "QueryInterface( )." The "QueryInterface( )" function can be called with an interface identifier as an argument, and returns a pointer to the interface associated with that interface identifier. The "IUnknown" interface of each COM object also includes member functions, "AddRef( )" and "Release( )", for maintaining a count of client programs holding a reference (e.g., an interface pointer) to the COM object. By convention, the "IUnknown" interface's member functions are included as part of each interface on a COM object. Thus, any interface pointer that the client obtains to an interface of the COM object 60 can be used to call the QueryInterface function.

COM+ Events Model

Figure 5:
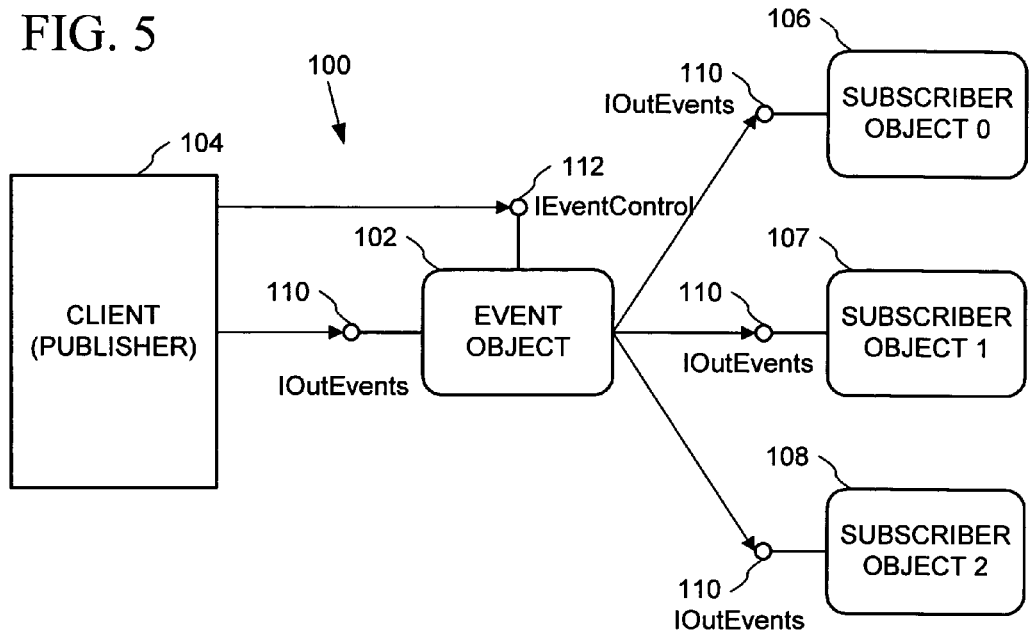
FIG. 5 is a block diagram a publish and subscribe event communications model that provides information distribution via an external event class object and outgoing interface method subscriptions according to an illustrated embodiment of the invention in a computer or distributed network of computers such as that shown in FIG. 3.

With reference to FIG. 5, the illustrated publish and subscribe event communications model 100 implemented in COM+ Events system provides an event class object 102 to distribute information produced by a publisher 104 to one or more subscribers 106-108 not known a priori to the publisher. For purposes of illustration, the following discussion refers as an illustrative example of a stock price reporting application, called "Stock Exchange," built using the illustrated model 100.

The publisher 104 is an application program in the model 100 that "fires" events. In other words, the publisher 104 is implemented as a client of a COM object. Firing an event in the model 100 is accomplished by calling a method on an outgoing-event interface 110 (exposed by the event class object 102) using the normal method call semantics of COM described above. The outgoing-event interface 110 is user-defined (generally by the publisher's developer), and thus can be defined to have any desired application-specific methods and interface name (e.g., the "IOutEvents" interface name shown in FIG. 5 or "IStockEvents" in the example Stock Exchange application).

More specifically, when publishing an event, the publisher 104 obtains an interface pointer of the outgoing-event interface, such as via a call to the "CoCreateInstance( )" API or to the "QueryInterface( )" method which specifies the interface identifier (IID) of the desired outgoing-event interface. The publisher 104 then calls a method on the interface using the interface pointer. The publisher may pass information as parameters of the method call. Alternatively, the occurrence of the method call itself may be the only information produced by the publisher as the event. Possible examples of application software that can be implemented as publishers in the model 100 include electronic messaging systems like Microsoft Corporation's Exchange; database systems such as Microsoft SQL Server; the illustrative "Stock Exchange" application; etc.

The event class object 102 (also hereafter referred to as an "event distribution object") is a COM Object that supports the outgoing-event interface 110. As just described, the publisher 104 calls a method of the interface 110 to "fire" an event. The event class object handles all the work of publishing the event to all subscribers of the event, including retrieving subscription information, creating the subscriber if not running, and multi-casting the event via calls to the individual subscribers. The outgoing-event interface 110 of the event class object 102 is defined by the application developer (e.g., the developer that writes the publisher 104). However, the implementation of the event class object, specifically the object's DLL file 80 (FIG. 4), is supplied by the COM+ Events system. The event class object 102 thus is a system-supplied object.

More specifically, the publisher's developer specifies globally unique identifiers (GUIDs) that are to identify the event class and outgoing event interface in COM, as well as the outgoing interface definition as described in the "Building The Publisher" section below with reference to FIG. 8. The COM+ Events system 140 (shown in FIG. 7) then registers the event class object DLL in association with these GUIDs in the system registry, such that the publisher can fire events using the GUIDs and have the distribution of the events handled by the distribution code in the event class object DLL supplied by the COM+ Events system. Specifically, the publisher 104 fires events by creating an event class object and issuing calls to its outgoing event interface using the GUIDs. Since the GUIDs are associated in the system registry with the event class object DLL, the publisher's calls invoke the distribution code (described in the "Event Class Internal Structure" section below) in the event class object DLL to distribute the events to the outgoing-event interface method's subscribers.

The event class object 102 additionally exposes a system-defined interface, called "IEventControl" (defined in a program listing 250 shown in FIG. 31). The publisher 104 can call methods exposed through this interface to further customize the behavior of the event class object 102, as further described below.

The subscribers 106-108 are COM Objects that have a subscription to a method or methods of the outgoing-event interface 110, which causes the event class object 102 to propagate events fired on the methods to the subscribers. The subscribers 106-108 individually expose outgoing-event interfaces 116 that are defined identically to the event class object's outgoing-event interface 110. The event class object 102 propagates the event by calling the method of the subscribers' outgoing-event interfaces that correspond to the method called by the publisher in the event class object's interface 110. The implementation of the outgoing-event interface methods in the subscriber 106-108 includes the subscriber code that processes or acts on the event.

Subscriptions

Figure 6:
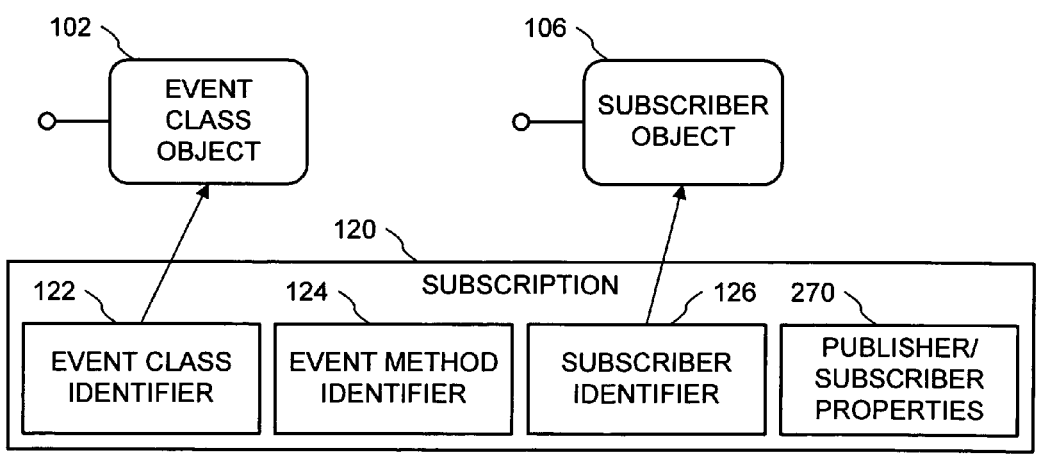
FIG. 6 is a block diagram of an outgoing interface method subscription that defines a relationship of the event class object to subscriber objects in the illustrated publish and subscribe event communications model of FIG. 5.

With reference now to FIG. 6, the relationship of a subscriber (e.g., the subscriber 106) to events is represented in the illustrated model 100 (FIG. 5) by a subscription 120. The illustrated subscription 120 is an object that contains an event class identifier 122 and an event method identifier 124 to specify the events, and a subscriber reference 126 to specify the subscriber 106. The event class identifier 122 is a class identifier (CLSID) associated with a class of event class objects that expose a particular developer-defined outgoing-event interface 110. The event method identifier 124 is a name of the method in the interface 110 that is subscribed to by the subscriber 106. The subscriber reference 126 is a reference to the subscriber 106. In other words, the subscription 120 associates a particular subscriber 106 to a particular method of the outgoing-event interface 110 of a particular event class object 102.

Subscriptions in the illustrated model 100 (FIG. 5) can be either of two types, persistent or transient. A persistent subscription uses a class identifier as the subscriber reference 126 to specify the subscriber 106. This allows the subscription to represent a relationship of subscriber to events that is independent of the subscriber's lifetime. By use of the subscriber's class identifier, the subscriber 106 can be instantiated at the time of an event in order to deliver the event. A transient subscription uses an interface identifier of an instance of the subscriber 106 as the subscriber reference 126. As a result, transient subscriptions can only be used for the particular instance of the subscriber, and are discarded when the subscriber is released.

Figure 7:
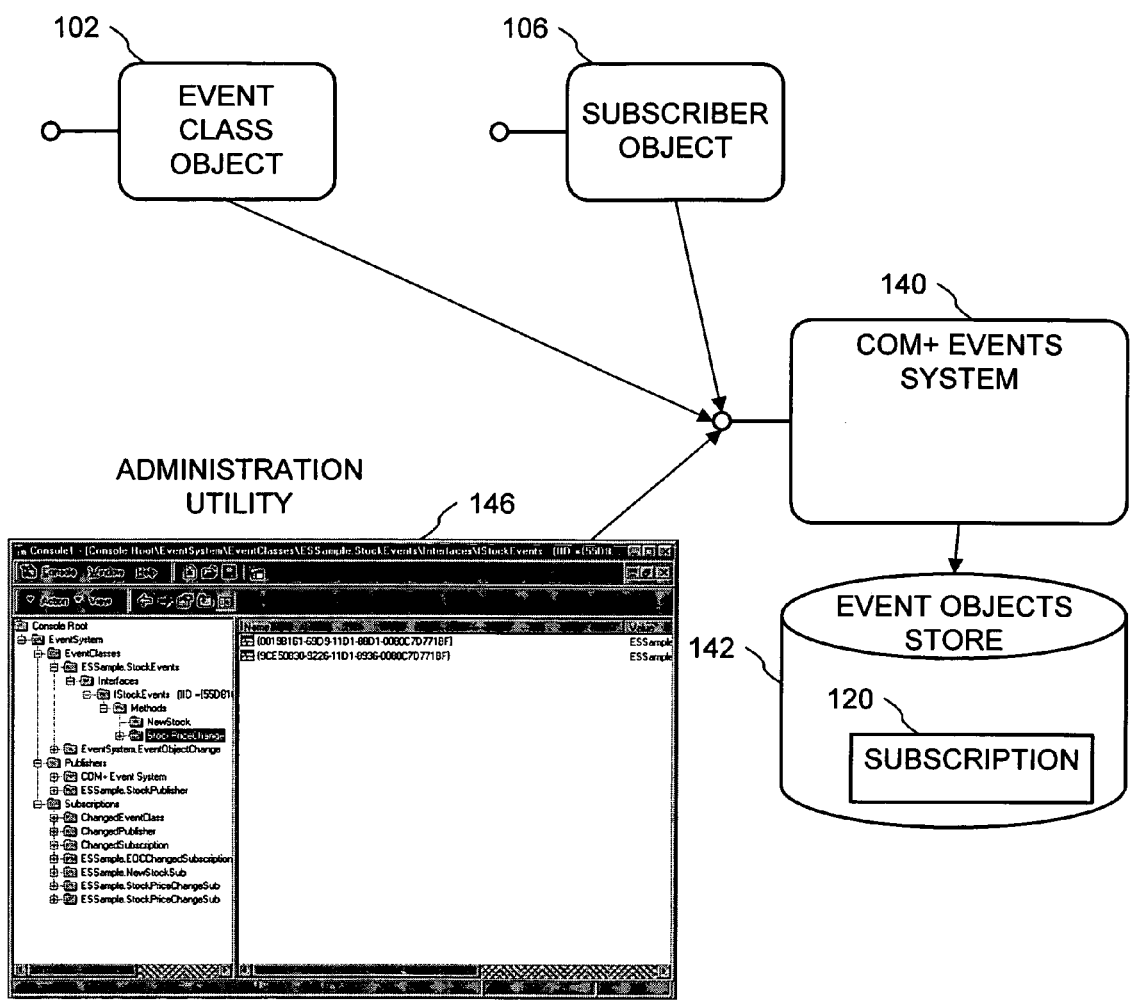
FIG. 7 is a block diagram of system services for managing and persistently storing the subscription in the illustrated event communications model of FIG. 5.

With reference to FIG. 7, the illustrated model 100 (FIG. 5) is realized in the computer 20 (FIG. 3) by a set of object services provided by the COM+ Events system 140 which manage the subscriptions 120. The COM+ Events system 140 is implemented in an executable file, called "ESServer.exe," that exposes application programming interfaces (APIs) in the form of system-defined COM Object interfaces that can be called by application programs to access COM+ Events system services. The COM+ Events system 140 stores persistent subscriptions to an event objects store 142 in non-volatile storage of the computer 20 (e.g., on the hard drive 27). The system 140 also maintains transient subscriptions in RAM memory 25 only during the lifetime of the subscriber 106.

The COM+ Events system 140 includes services in the form of application programming interface (API) functions that can be called to register, remove or modify subscriptions, as well as to retrieve or enumerate subscriptions to a particular outgoing-event interface method. In some cases, the subscriber objects 106-108 (FIG. 5) implement the code that calls the COM+ Events API function for registering a subscription so as to subscribe to a particular outgoing-event interface method. The event class object 102 also calls the COM+ Events subscription retrieval/enumeration APIs when an event is "fired" by the publisher 104 (as described in the "Event Class Internal Structure" section below), so as to then pass the event to the events' subscribers.

Additionally, any other program can use the subscription registration API of the COM+ Events system's services to enter a subscription for a subscriber object. Accordingly, the subscriber object 106 in the illustrated model 100 is only required to implement the outgoing-event interface 110, and need not include code to register a subscription. Subscriptions can instead be entered for the subscriber object 106 by an installation program that is run at installation of the subscriber object on the computer 20, by other component programs of an application that incorporates the subscriber object, or by an administration utility with which a user configures subscriptions for the subscriber object, among many other possible other programs. In particular, the illustrated embodiment of the invention includes an administration utility program 146, called the "Microsoft Management Console," having a graphical user interface in which an administrator or like human operator of the computer 20 can view and configure properties of objects. In the graphical user interface of this utility, the administrator configures subscriptions of particular objects (e.g., subscriber objects 106-108) to particular outgoing-event interface methods. The utility 146 enters the subscriptions configured by the administrator into the COM+ Events system using the COM+ Events subscription registration API.

Building The Publisher

Figure 8:
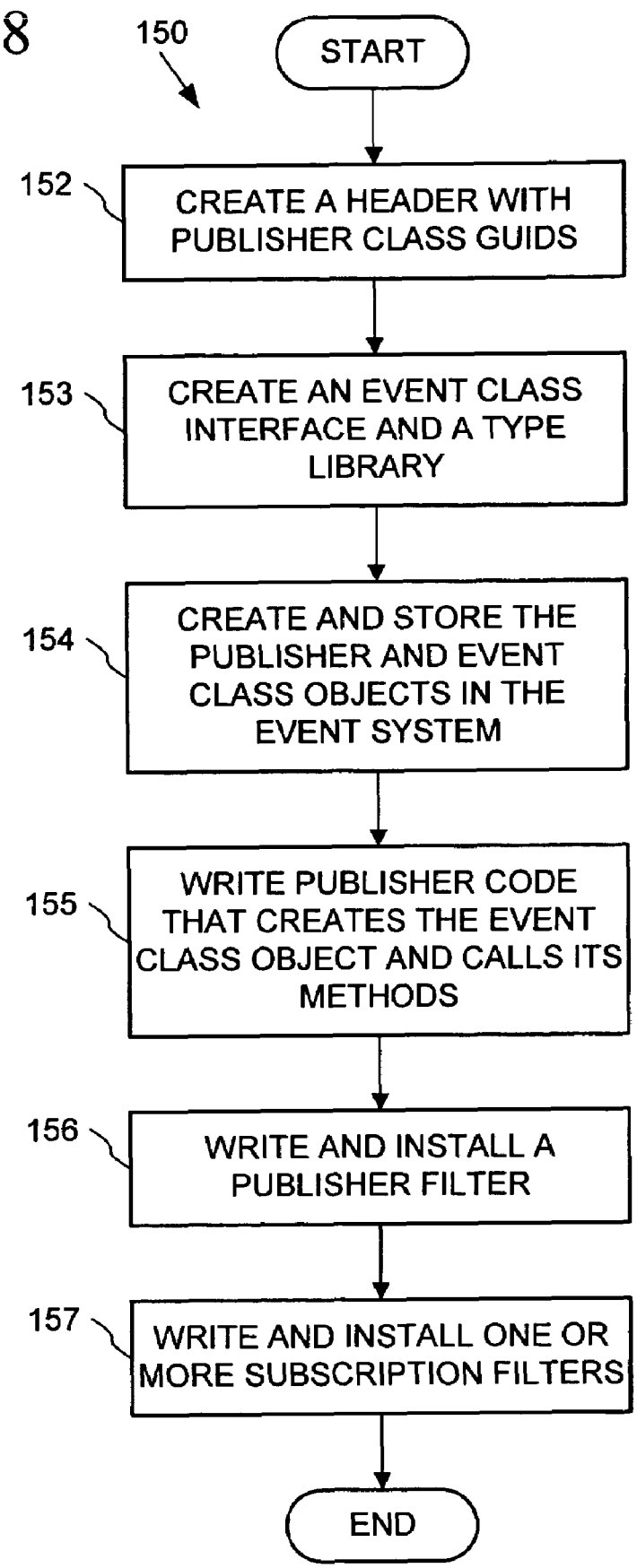
FIG. 8 is a flow chart of a process for building the publisher in the illustrated event communications model of FIG. 5.

With reference to FIG. 8, a developer of the publisher 104 (FIG. 5) builds the publisher in the illustrated event model 100 according to steps 152-157 of a process 150. In the following discussion, the process 150 is described with reference to sample code (shown in FIGS. 9-16) of the exemplary "Stock Exchange" application, which code is written in the C++ programming language. However, other programming languages alternatively can be used to build the publisher in the process 150.

In a first step 152 of the process 150, the developer writes a header file that defines a globally unique identifier (GUID) to be used as the publisher identity that designates the publisher 104 in the illustrated event model 100. For example, FIG. 9 shows a program listing 160 of such a header file for the publisher in the "Stock Exchange" application example.

In a step 153, the developer writes a definition of the outgoing-event interface 110 (FIG. 5) whose methods the publisher 104 calls to fire events, and also writes an associated type library. The definition defines characteristics of the interface in the form of a script written in an interface definition language, such as the Microsoft Interface Definition Language (MIDL). Per COM conventions, a type library is a binary file (identified by a ".TLB" file name extension) that contains standard descriptions of exposed objects, properties, and methods that are available for automation by other programs in a standard form that is accessible to the other programs at run-time, such as information of the data types. The type library is used by the COM+ Events system 140 (FIG. 7) to retrieve information about the outgoing-event interface at run-time. Since many subscribers import the IDL definition only, the IDL definition and type library preferably are kept as separate files. For example, FIGS. 10 and 11 show a program listings 162-163 of a MIDL definition and type library, respectively, for the "IStockEvents" outgoing event interface of the publisher in the "Stock Exchange" application example.

In step 154, the developer creates and stores the publisher and event class objects with the COM+ Events system 140. Typically, the developer accomplishes this by writing an installation program that starts up the COM+ Events system 140, creates the publisher and event class objects, and then causes the COM+ Events system 140 to store the object (using the services' "Store( )" method). For example, FIGS. 12-14 show a program listing 164 of such an installation program in the "Stock Exchange" application example.

In step 155, the developer writes client code for the publisher 104 that creates the event class object 102 and fires an event by calling a method of the outgoing event interface 110. For example, FIG. 15 shows a program listing 166 of publisher code in the "Stock Exchange" application example that fires a stock price update event to be published by the event class to any subscribers of the "IStockEvents::StockPriceChange( )" method.

Steps 156 and 157 are optional, and relate to publisher and subscriber filters which are described in the Event Filtering section below.

Building Subscribers

Figure 17:
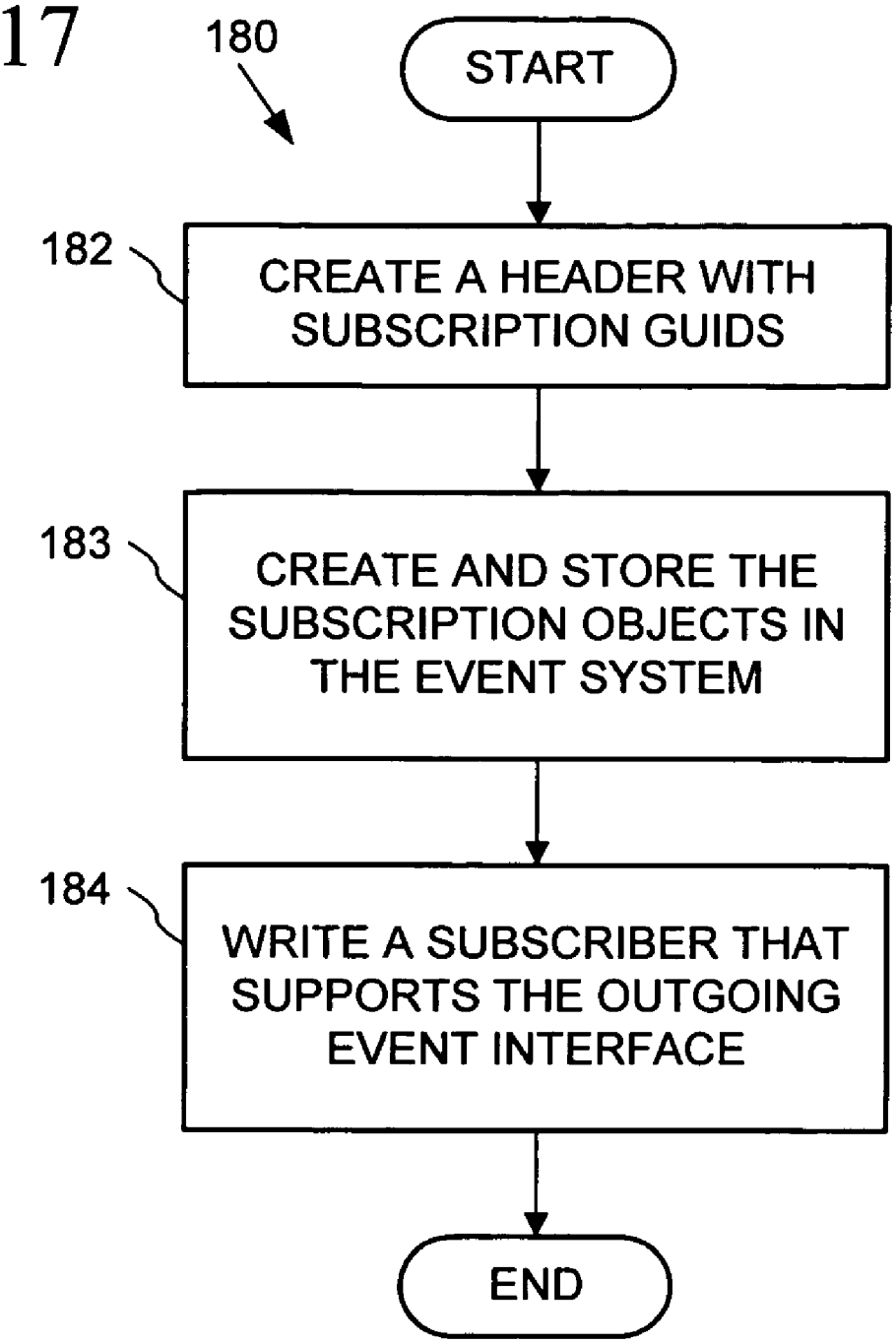
FIG. 17 is a flow chart of a process for building the subscriber and its subscription(s) in the illustrated event communications model of FIG. 5.

With reference now to FIG. 17, a developer of the subscribers 106-108 (FIG. 5) typically builds a subscriber and its subscriptions according to a sequence of steps 182-184 of a process 180. In the following discussion, the process 180 is illustrated with reference to code samples of the exemplary "Stock Events" application, which are written in the C++ programming language. Alternatively, other programming languages can be used in the process 180.

At a first step 182 in the process 180, the developer writes a header file that defines subscription GUIDs for identifying the subscriptions when stored with the COM+ Events system 140. For example, FIG. 18 shows a program listing 190 of such a header file for subscriptions of a subscriber in the "Stock Exchange" application example.

At a step 183, the developer creates and stores subscriptions with the COM+ Events system 140 (FIG. 7). Typically, the developer accomplishes this by writing an installation program that starts up the COM+ Events system 140, creates the subscription object(s) 120 (FIG. 6), and then causes the COM+ Events system 140 to store the subscriptions. For example, FIG. 19 shows a program listing 192 of such an installation program in the "Stock Exchange" application example.

At a step 184, the developer writes the subscriber 106-108 as a COM Object that supports the outgoing event interface 110, and includes application-specific code that acts on the events delivered via the event communications model 100 to the subscriber. The developer writes the subscriber using well known practices and tools for creating COM Objects, such as the Microsoft Visual C++ programming language system.

Event Class Internal Structure

Figure 20:
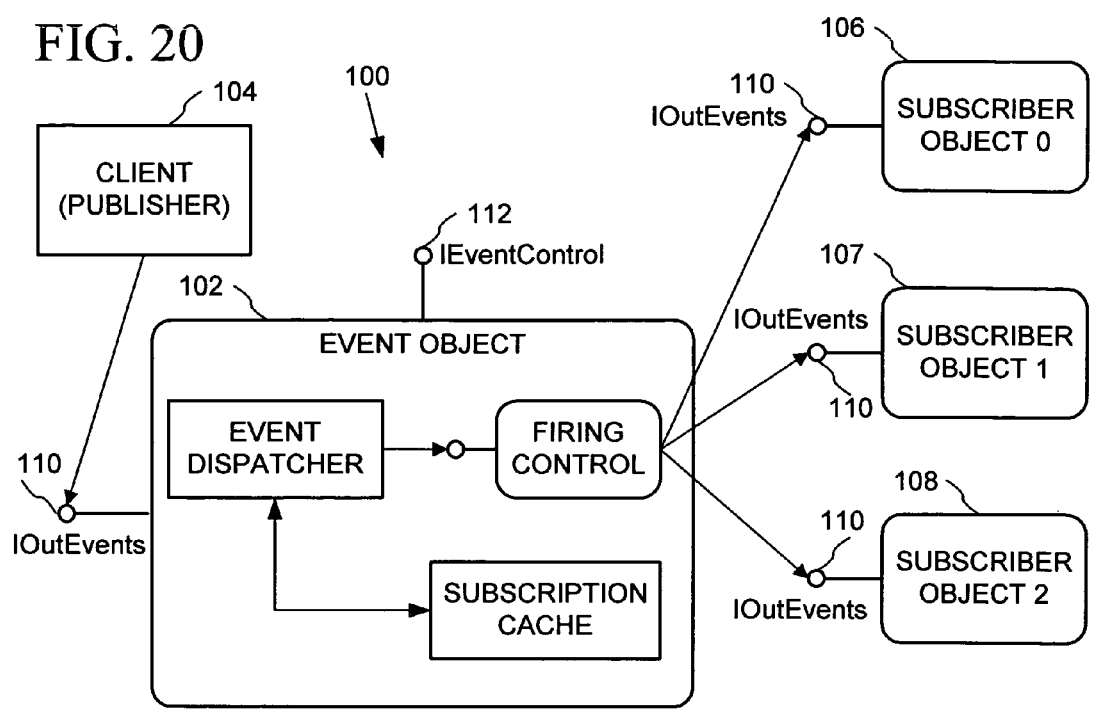
FIG. 20 is a block diagram an internal structure of the event class object in the event communications model of FIG. 5.

With reference now to FIG. 20, the event class object 102 that is supplied by the COM+ Events system internally has an event dispatcher 200, a firing controller 202, and a subscription cache 204. These internal components of the event class object 102 can be implemented as separate sub-objects created and used by the event class object, or alternatively as routines incorporated directly into the event class object's code.

The event dispatcher 200 essentially acts as a multi-casting loop for the event class object 102. The event dispatcher includes a program routine that is invoked when the publisher 104 issues a method call to one of the methods in the outgoing-event interface 110 of the event class object. This program routine includes instructions that retrieve any subscriptions for the publisher-called outgoing-event interface method from the COM+Events system (e.g., via the "IEventControl::GetSubscriptions( )" method shown in a program listing 240 of FIG. 31 and described below) into the subscription cache 204. The program routine further includes an instruction loop which, for each such subscription, causes the firing control 202 (e.g., via the "IFiringControl::FireSubscription( )" method shown in a program listing 234 of FIG. 25 and described below) to call the counterpart method of the outgoing-event interface 110 of the subscriber 106-108 that is specified in the respective subscription.

The firing control 202 controls delivering the event for a particular subscription. More particularly, the firing control 202 performs the actions necessary to deliver the event to the respective subscriber for the subscription, depending on whether the subscription is persistent or transient. In the case of a persistent subscription which specifies the subscriber by class identifier, the firing control 202 creates the subscriber if not yet instantiated, obtains an interface pointer to its outgoing-event interface, and calls the counterpart method on the subscriber outgoing-event interface to that initially called by the publisher to deliver the event. In the case of a transient subscription which specifies the subscriber by an interface pointer, the firing control 202 need not instantiate the subscriber, but instead obtains the outgoing event interface pointer and calls the counterpart method to deliver the event. In the illustrated model 100, the firing control 202 is implemented as a COM Object that supports an IFiringControl interface 210 (defined as shown in the program listing 238 of FIG. 25) having a "FireSubscription( )" method. The event dispatcher 200 calls the "FireSubscription( )" method to cause the firing control 202 to deliver the event for a particular subscription.

The subscription cache 204 temporarily stores the subscriptions per each method of the event class object's outgoing-event interface for use by the event dispatcher 200, so as to allow more rapid distribution of events to the subscribers 106-108. In the illustrated model 100, the subscription cache 204 consists of a set of event object collections, which are COM Objects supplied by the COM+ Events system that support an "IEventObjectCollection" interface as defined in a program listing 246 shown in FIG. 29. The "IEventObjectCollection" interface exposes methods to enumerate a collection of objects that can be stored in the COM+ Events system, including event class, publisher, and subscription objects.

COM+ Events System Objects and Interfaces

FIGS. 21-31 are program listings 230-241 of various interfaces defined per the COM+ Events system. These system-defined interfaces are exposed by various system-provided objects, as well as by the publisher 102 and subscriber 106 objects written by the application developer or other user of the illustrated event communications model 100 (FIG. 5) for integration into the model.

The program listing 230 of FIG. 21 defines an IEventSystem interface that is exposed by the COM+ Events system 140 (FIG. 7). The IEventSystem interface includes the methods, "Query( )," "Store( )," "Remove( )," and "EventObjectChangeEventClassID( )." The "Store( )" method is used to install objects into the event objects store 142 (FIG. 7), such as the publisher 104 and the event class 102 supporting the publisher's outgoing-event interface (as demonstrated in the program listing 164 of FIG. 13 of the Stock Exchange application example), as well as the subscriptions 120 (as demonstrated in the program listing 192 of FIG. 19).

The "Query( )" method is used to retrieve objects from the event objects store 140. The method takes two input parameters ("ProgID" and "wszQueryCriteria") and two output parameters ("errorIndex" and "ppInterface"). The "ProgID" parameter identifies the type of object to be retrieved from the event objects store 140. The valid type values that can be specified in this parameter are listed in the header file statements shown in the program listing 242 of FIG. 32.

The "QueryCriteria" parameter is a character string that specifies a search criteria. The program listing 244 in FIG. 33 shows three examples of different search criteria used in these event object retrieval queries. The search criteria, "All," in the first example retrieves all objects of the specified type (i.e., subscriptions 120). The second example's search criteria retrieves only the subscriptions to a given event class for a particular publisher's outgoing-event interface. The third example's search criteria retrieves only the subscriptions specific to one method (i.e., the "StockPriceChange" method in the Stock Exchange application example).

The "errorIndex" parameter is a counter that indicates the location or offset in the search criteria string of a syntax error. In the case of a syntax error, the "Query( )" method also returns a result of "FACILITY_ITF" to signal the syntax error to the caller.

The "ppinterface" parameter is an interface pointer to the event object retrieved as a result of the query. The types of interface pointer returned are from the following list: "IEventPublisher," "IEventClass," "IEventSubscription," "IEventPublisherCollection," "IEventClassCollection," and "IEventSubscriptionCollection."

The "Remove( )" method of the "IEventSystem" interface (FIG. 21) uses similar parameters (i.e., similar to those just described for the "Query( )" method) to request removal of event objects from the event object store 142 (FIG. 7).

The program listing 231 of FIG. 22 defines an "IEventPublisher" interface that is exposed by the publisher 104. The "IEventPublisher" interface includes methods to set and get information concerning the publisher 104, such as the publisher's identifier, name, type, owner, description, collection of properties, and security control data.

The program listing 232 of FIG. 23 defines an "IEventClass" interface that is exposed by the event class object 102. The "IEventClass" interface includes methods to set and get information concerning the event class object 102, such as an identifier, a name, an owner, a firing interface identifier (specifies the firing control 202 of FIG. 20), a description, a custom configuration class identifier, a type library, and security control data.

The program listing 233 of FIG. 24 defines an "IEventSubscription" interface that is exposed by the subscription 120 (FIG. 6). The "IEventSubscription" interface includes methods to set and get various data contained by the subscription, including a subscription identifier, a subscription name, a publisher identifier (specifies the publisher 104), the event class identifier 122 (specifies the event class 102), the method name 124 (specifies the outgoing-event interface name that is subscribed), a subscriber class identifier and/or interface 126 (specifies the subscriber 106-108), per user and enabled flags, an owner identifier, a machine name, publisher and subscriber properties 270, and security control data.

The program listing 234 of FIG. 25 defines an "IFiringControl" interface that is exposed by the firing control 202 in the event class object 102 (FIG. 20). The "IFiringControl" interface includes a "FireSubscription( )" method that the event dispatcher 200 (or publisher filter 250 described below) calls to cause delivery of an event to the subscriber 106-108 of a particular subscription.

The program listing 235 of FIG. 26 defines an "IPublisherFilter" interface exposed by a publisher filter 250 (FIG. 34) with methods used in custom event filtering as described below.

The program listing 236 of FIG. 27 defines an "ISubscriberControl" interface exposed by a subscriber filter 260 (FIG. 35) with methods also used in custom event filtering as described below.

The program listing 237 of FIG. 28 defines an "IEventObjectChange" interface, which is an outgoing-event interface of the COM+ Events system 140. The COM+ Events system 140 calls methods of the "IEventObjectChange" interface to publish notifications of changes to the event objects in the event objects store 142, such as when a new subscription is added. To receive these notifications, objects (such as the event class object 102, subscription collections, or a Microsoft Windows Explorer like administration utility) expose the "IEventObjectChange" interface and register a subscription to its methods with the COM+ Events system 140. In particular, the "IEventObjectChange" interface includes methods to provide notifications of changes to the subscriptions, event classes, and publishers recorded in the event objects store 142. The method provides only an identifier of the changed object, so that the recipient (i.e., the subscriber to the "IEventObjectChange" interface) must then query the COM+ Event System to retrieve a copy of the affected object. The event class object for the "IEventObjectChange" interface implements a publisher filter (described below) which allows subscriptions to this interface to specify which event object changes are of interest. The changes of interest are specified in a publisher property 270 (FIG. 6) as query criteria string in the same form as the "QueryCriteria" parameter of the "IEventSystem::Query( )" method (FIG. 21) described above.

The program listing 238 of FIG. 29 defines an "IEnumEventObject" interface and an "IEventObjectCollection" interface, which are exposed by enumeration and collection objects provided by the COM+ Events system 140 (FIG. 7)—such as in response to the "IEventSystem::Query( )" method described above. These enumeration and collection objects are subscribers of the "IEventObjectChange" interface so that they receive notifications of changes to the event objects store 142, and automatically update their collection of event class objects, publisher, or subscriptions.

The program listing 239 of FIG. 30 defines an "IEventProperty" interface exposed by a property object that represents a name/value pair stored as publisher and subscriber properties 270 in the subscription 120 (FIG. 6). The "IEventProperty" interface includes method to set and get the name and value contained in the property object.

The program listing 240 of FIG. 31 defines the "IEventControl" interface 112 exposed by the event class object 102 (FIG. 5). The "IEventControl" interface includes a "SetPublisherFilter( )" method used by the publisher 104 to install a publisher filter 250 for custom event filtering described below, and a "GetSubscriptions( )" method to retrieve the subscriptions for the outgoing-event interface 110 managed by the event class object 102. This interface also includes methods to set and get an "allow in-process activation" flag, and set the default query (that determines the subscriptions retrieved for the event class object from the event objects store 142).

Custom Event Filtering

The illustrated COM+ Events system also supports add-on or plug-in custom filtering of published events upon event distribution. The COM+ Events system defines integration interfaces that allow a developer (e.g., the developer of either the publisher 104 or the subscriber 106-108) to effectively insert any desired custom filtering logic into the event distribution logic (i.e., the event class object 102), so as to perform some desired filtering of events (i.e., determining which subscribers actually get called on a given event) or other processing at event distribution time. This plug-in custom filtering logic takes the form of a publisher filter 250 (FIG. 34) or subscriber filter 260 (FIG. 35) that the developer writes as a COM object supporting the outgoing-event interface and system-defined integration interfaces.

With reference again to FIG. 6, the subscription 120 optionally contains a set of publisher and subscriber properties 270 that can be used by the custom filtering logic in the publisher filter 250 or subscriber filter 260 in filtering events. The publisher and subscriber properties 270 generally are in the form of name/value pairs, which may for example indicate the name of a parameter of the outgoing-event interface method identified by the event method identifier 124 and a value of that parameter. The custom filtering logic can use such name/value pairs in connection with the parameter values specified in the publisher's outgoing-event interface method call to determine whether to fire the event to the subscriber identified in the subscription according to its particular filtering criteria.

For example, the publisher in the Stock Exchange application example defines an outgoing-event interface with two methods, "NewStock( )" and "StockPriceChange( )," which the publisher calls to report that a new stock has been added to the exchange and that a stock's price has changed, respectively. The "StockPriceChange( )" method includes a "StockSymbol" parameter whose value indicates the stock whose price has change. Subscribers in the Stock Exchange application are expected to always want to be informed of new stocks, but may only want to be informed when specific stock price changes. To allow filtering of the "StockPriceChange( )" method call events, the subscriptions 120 to that method can include a property in the publisher and subscriber properties 270 that indicates the "StockSymbol" parameter name and a value (e.g., "MSFT") for the stock of interest to the subscriber. The filtering logic can then examine the property in each subscription for the "StockPriceChange( )" method to check whether the property's value matches that of the "StockSymbol" parameter in the publisher's call, and deliver the event to the subscribers of the subscriptions 120 whose properties 270 indicates an interest in the particular stock price change reported by the event.

Figure 34:
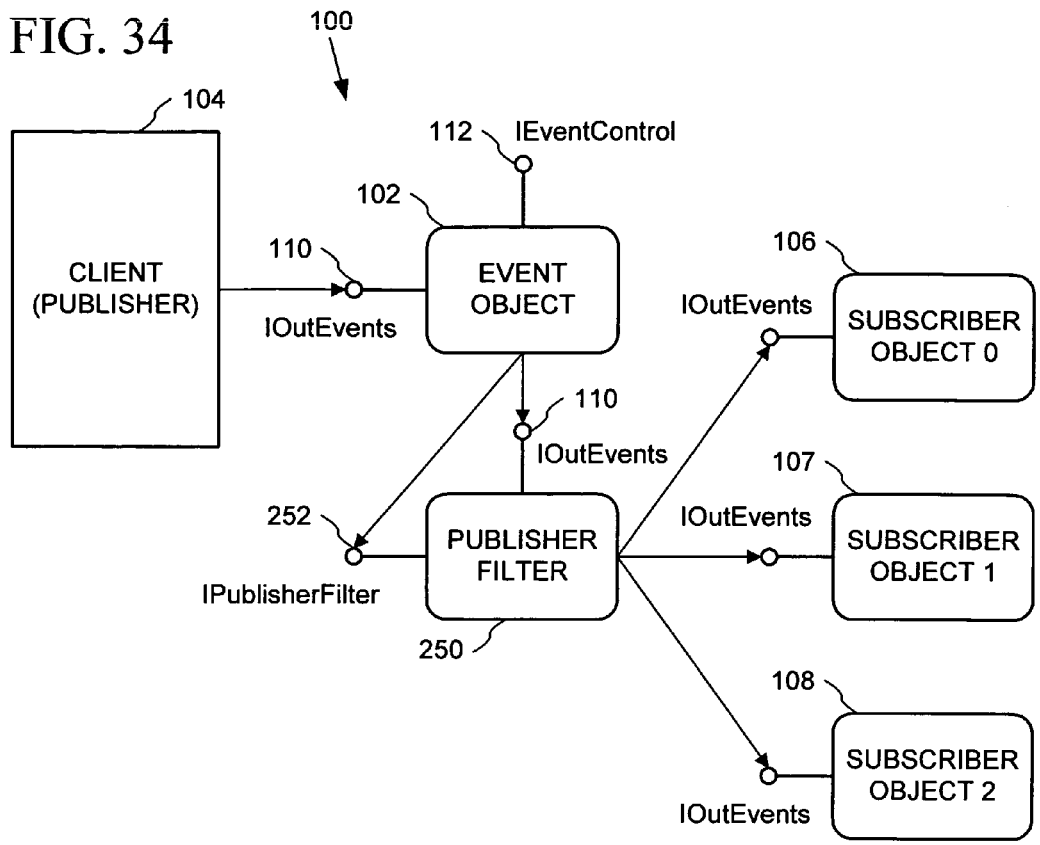
FIG. 34 is a block diagram a publisher filter object in the event communications model of FIG. 5.

More specifically with reference to FIG. 34, plug-in custom filtering logic is inserted on the publisher-side of the illustrated event communications model 100 in the form of a publisher filter 250. The publisher filter 250 is a COM object that supports the outgoing-event interface 110 (defined by the publisher developer) and a system-defined publisher filter interface 252 (shown in the program listing 235 of FIG. 26). The publisher filter 250 substitutes for the event dispatcher 200 (FIG. 20) in the event class object 102, which effectively moves the "firing loop" out of the COM+ Events system-provided event class and into application code (i.e., the publisher filter) provided by the publisher's developer. As such, the publisher filter is responsible for iterating over the list of subscriptions to the event and firing the event to its subscribers.

With reference to FIG. 36, the publisher 104 installs the publisher filter 250 (FIG. 34) by calling the "IEventControl::SetPublisherFilter( )" method, such as shown in the example publisher code in the program listing 254. In the program listing 254, the publisher 104 first queries the event class object 102 (using the outgoing-event interface 110 pointer returned from creating the event class object instance) for a pointer to the event class object's "IEventControl" interface 112 (defined in the program listing 240 shown in FIG. 31). The publisher 104 then calls the event class object's "SetPublisherFilter( )" method. As parameters to this call, the publisher 104 specifies an outgoing-event interface method name and an interface pointer to the publisher filter 250 (obtained when the publisher 104 creates the publisher filter 250 instance). The outgoing-event interface method name determines which of the publisher's events are filtered by the particular publisher filter (i.e., only events initiated by the publisher's call to the specified outgoing-event interface method are filtered by the publisher filter 250). As a result of the publisher filter installation, the event class object 102 will use the publisher filter 250 in place of the system's standard event dispatcher 200 (FIG. 20) when the publisher issues events.

In addition to installing the publisher filter 250 with the event class object 102, the publisher 104 also initializes the publisher filter 250 in a call to the "IPublisherFilter::Initialize( )" method (FIG. 26). In this call, the publisher 104 passes a parameter (the "dispUserDefined" parameter) to specify a collection of subscriptions or alternatively an interface which may be called by the publisher filter to retrieve the collection of subscriptions that are associated with an outgoing-event interface method specified as the other parameter (the "methodName" parameter). The publisher 104 obtains such collection of subscriptions from the COM+ Events System via a call to the "IEventControl::GetSubscriptions( )" method of the event class object 102. The collection returned from the "GetSubscriptions( )" method is special in that the COM+ Events System automatically updates the collection in synchrony with the subscriptions 120 in the event objects store 142 (FIG. 7), so that any new subscriptions added to the database after the publisher's "GetSubscriptions( )" call also are automatically added to the collection. In cases where the outgoing-event interface has multiple methods filtered through the publisher filter 250, the publisher 104 may call the initialize method multiple times to separately initialize the publisher filter 250 for each of the outgoing-event interface's methods.

At event distribution time (i.e., when the publisher 104 calls the outgoing-event interface method to issue an event), the event class object 102 first calls the "IPublisherFilter::PrepareToFire( )" method. In the "PrepareToFire( )" method call, the event class object 102 informs the publisher filter 250 which method has been called by the publisher 104 (via the "methodName" parameter) and passes (via the "firingControl" parameter) an "IFiringControl" interface (FIG. 25) pointer of the firing control object 202 (FIG. 20). With this information, the publisher filter 250 determines which collection of subscriptions will be used on the next event. After the "PrepareToFire( )" call returns, the event class object 102 next calls the method on the publisher filter's outgoing-event interface 110 that corresponds to that called by the publisher. This provides the publisher filter 250 with the outgoing-event interface method's parameter values. The publisher filter 250 is now able to iterate over the collection of subscriptions for the event or outgoing-event interface method called by the publisher 104, and fire the event via the firing control object 202 (FIG. 20) to those of the subscriptions meeting the filtering criteria imposed by the publisher filter (e.g., based on some combination of the publisher properties 270 in the subscription 120 (FIG. 6) and the actual parameter values of the called outgoing-event interface method).

Figure 35:
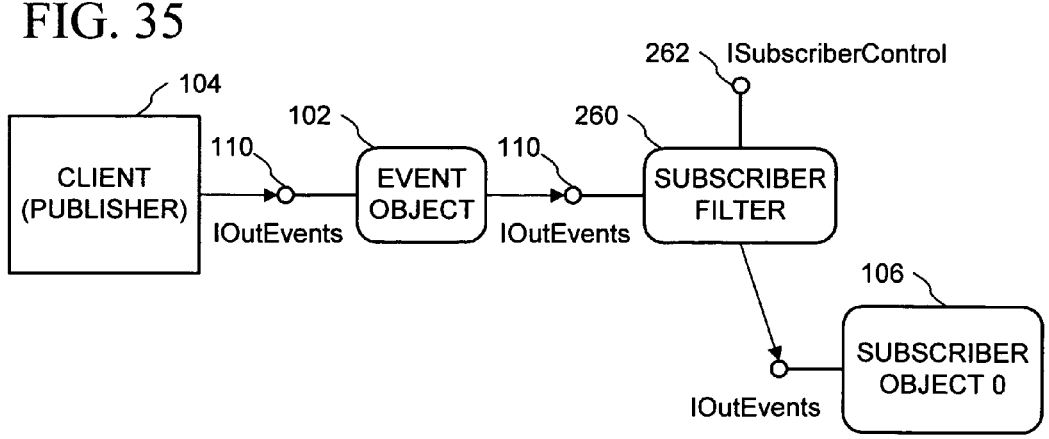
FIG. 35 is a block diagram a subscriber filter object in the event communications model of FIG. 5.

With reference now to FIG. 35, the subscriber 106 also can interpose custom filtering logic through the subscriber filter 260 in the event distribution flow of the illustrated event communications model 100 (FIG. 5) to control which of the subscribed events are actually delivered. The subscriber filter 260 is a COM object that supports both the publisher-defined outgoing-event interface 110 and a system-defined "ISubscriberControl" interface 262 (defined in the program listing 236 shown in FIG. 27). The subscriber filter 260 is installed into the illustrated model 100 (FIG. 5) by placing a subscription 120 (FIG. 6) with the COM+ Events system in which the subscriber identifier indicates the subscriber filter 260 in place of the "end-" subscriber 106 itself.

On delivery of an event on a subscription with a subscriber filter, the event class object 102 first calls the subscriber filter's "ISubscriberControl::PreEventCall( )" method before firing the event as a call to the subscriber filter's outgoing-event interface 110. The event class object 102 can determine that the subscription specifies a subscriber filter by issuing a query interface for the "ISubscriberControl" interface 262. The event class object 102 passes an interface pointer to the subscription 120 that is actively being fired as a parameter (the "pISubscription" parameter) of the "PreEventCall( )" method. With the subscription interface pointer, the subscriber filter 260 is able to access the subscriber properties 270 in the subscription 120. These subscription properties can include an interface pointer, class or program identifier of the end-subscriber 106, as well as name/value pairs for use by the subscriber filter in filtering events.

After the "PreEventCall( )" method returns, the event class object 102 calls the method on the outgoing-event interface 110 of the subscriber filter 260 that corresponds to that called by the publisher 104. In the outgoing-event interface method call, the subscriber filter 260 is passed the parameter values of the publisher's event call. The subscriber filter 260 is then able to filter the event based on the subscriber properties 270 in the subscription 120 and the outgoing-event interface method parameters. If the subscriber filter's filtering criteria is met, the subscriber filter issues a call to the subscriber object 106 to finally deliver the event. The call to the subscriber object 106 can be a call to an outgoing-event interface method corresponding to the publisher's initial call. Another alternative use of the subscriber filter is to transform the event into a call on a different subscriber interface and/or method. An example of such a subscriber filter event call transformation is a computer system administration application, in which a publisher issues a call to a method of an outgoing-event interface, "ICatastrophe," to indicate that the occurrence of a catastrophic fault was detected. In this example, the subscriber filter can transform the publisher's "ICatastrophe" interface method call into a call to an "IPage" interface of a subscriber object that provides services to initiate a paging message to a pager device carried by the system administrator. The phone number needed for the call to the "IPage" interface's method can be retrieved by the subscriber filter 260 from the subscriber properties 270 in the subscription 120 (FIG. 6).

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method performed by an event communications system on a computer for efficiently distributing event information in software programmed according to an object model, the method comprising:

receiving by an event handling object via an outgoing interface, a call from a publisher object, the call comprising an event signal from the publisher object and wherein the publisher object lacks information about an identity of a subscriber object, and wherein the subscriber object exposes an interface that receives a method call;

accessing by the event handling object, a data storage separate from the publisher and subscriber objects for storing subscriptions externally of the publisher and subscriber objects;

determining a subscription out of the stored subscriptions representing a relationship of the subscriber object to an outgoing interface method and serving to link the publisher object's call to the outgoing interface method over to the subscriber object; and upon receiving the call from the publisher object at the outgoing interface retrieving the subscription and issuing the method call to the subscriber object's exposed interface based on the subscription so as to thereby deliver the event to the subscriber object;

wherein the interface exposed by the subscriber object matches the outgoing interface exposed by the event handling object.

2. The method of claim 1, wherein the event handling object is external to the publisher object and wherein the matching interfaces have identical interface structures.

3. The method of claim 1, wherein at least one of the subscriptions identifies the subscriber object by a class identifier associated with a class of the subscriber object, whereby the subscriber object need not be instantiated at a time that said at least one subscription is created and at a time that the publisher object calls the method on the outgoing interface to signal the event.

4. The method of claim 1, wherein another of the subscriptions identifies the subscriber object by an interface pointer directly linking to the interface of the subscriber object.

5. The method of claim 1, wherein the data storage persistently stores the subscriptions to survive interruptions in the subscriber object's lifetime.

6. The method of claim 1 further comprising:

creating the subscription for the subscriber object by a subscription creation service in response to a request made by a program outside the subscriber object; and storing the subscription in the data storage.

7. A method in a computer system for implementing an object-oriented event communications model for distributing events from a publisher to any subscribers of the events, the publisher being programmed to issue an event as a method call on an outgoing event interface exposed by an object which outgoing event interface and object are identified by unique identifiers defined for the publisher, the method comprising:

associating the unique identifiers to an event distribution object class having the outgoing event interface; and supplying an event distribution object of the event distribution object class, the event distribution object operative in response to the publisher's method call that issues the event so as to distribute the event to the event's respective subscribers;

wherein the event distribution object multi-casts calls to methods on counterpart outgoing event interfaces exposed by event's subscribers when counterpart outgoing event interfaces exposed by event's subscribers match the publisher's method call.

8. The method of claim 7, wherein the outgoing event interface exposed by the distribution object has an interface definition defined for the publisher.

9. An event communications system on a computer for efficiently distributing event information in software programmed according to an object model, the software having a publisher object and a subscriber object wherein the publisher object has code to call a method on an outgoing interface to signal an event and lacks information about an identity of the subscriber object, and wherein the subscriber object exposes an interface that receives a method call, the system comprising:

a data storage means separate from the publisher and subscriber objects for storing subscriptions externally of the publisher and subscriber objects, a subscription out of the stored subscriptions representing a relationship of the subscriber object to an outgoing interface method and serving to link the publisher's call to the outgoing interface method over to the subscriber object; and an event handling means for exposing the outgoing interface and having code of the outgoing interface method operative in response to the publisher object's call to retrieve the subscription and issue the method call to the subscriber object interface based on the subscription so as to thereby deliver the event to the subscriber object;

wherein the interface exposed by the subscriber object matches the outgoing interface exposed by the event handling means.

10. The system of claim 9, wherein the event handling means is external to the publisher object and wherein the matching interfaces have identical interface structures.

11. The system of claim 9, wherein at least one of the subscriptions identifies the subscriber object by a class identifier associated with a class of the subscriber object, whereby the subscriber object need not be instantiated at a time that said at least one subscription is created and at a time that the publisher object calls the method on the outgoing interface to signal the event.

12. The system of claim 9, wherein another of the subscriptions identifies the subscriber object by an interface pointer directly linking to the interface of the subscriber object.

13. The system of claim 9, wherein the data storage means persistently stores the subscriptions to survive interruptions in the subscriber object's lifetime.

14. The system of claim 9 further comprising a subscription creation service for a program outside the subscriber object to programmatically create the subscription for the subscriber object, and store the subscription in the data storage means.

15. A computer system comprising:

a processor;

a memory connected to the processor;

an object-oriented event communications model for distributing events from a publisher to any subscribers of the events, the publisher being programmed to issue an event as a call to a method on an outgoing event interface exposed by an object which outgoing event interface and object are identified by unique identifiers defined for the publisher, the computer system comprising: means for associating the unique identifiers to an event distribution object class having the outgoing event interface; and means for supplying an event distribution object of the event distribution object class, the event distribution object having means for distributing the event to the event's respective subscribers in response to the publisher's call that issues the event;

wherein the event's subscribers expose counterpart outgoing event interfaces, and the event distribution object further has means for multi-casting calls to methods on the counterpart outgoing event interfaces matching the publisher's call.

16. The computer system of claim 15, wherein the outgoing event interface exposed by the event distribution object has an interface definition defined for the publisher.

17. A computer system comprising:

a processor;

a memory connected to the processor;

an event distribution means associated with a outgoing event interface definition, an identifier of the event distribution means, and an identifier of an outgoing event interface, all defined for a publisher programmed to call methods of the outgoing event interface to cause the event distribution means to distribute events, the event distribution means comprising, an outgoing event interface supported by the event distribution means and defined per the outgoing event interface definition of the publisher, a plurality of subscribeable methods exposed through the outgoing event interface, a multicasting distribution program loop operative in response to a publisher's call to a subscribeable method of the outgoing event interface to determine any subscribers to the subscribeable method and issue calls to counterpart methods of said any subscribers, and plural subscriptions comprising at least one transient subscription indicating a relationship of a subscriber to an event as indicated by an interface identifier of an instance of a subscriber as a subscriber reference and at least one persistent subscription indicating a relationship of a subscriber to an event as indicated by a class identifier as a subscriber reference, wherein the outgoing event interface supported by the event distribution means matches an interface to counterpart methods of said any subscribers.

* * * * *